(12) United States Patent
Berrada et al.

(10) Patent No.: US 12,244,894 B2
(45) Date of Patent: *Mar. 4, 2025

(54) METHODS AND APPARATUS TO DETECT A PRESENCE STATUS

(71) Applicant: The Nielsen Company (US), LLC, New York, NY (US)

(72) Inventors: Meryem Berrada, Clearwater, FL (US); Ronny Lerch, San Antonio, FL (US); John Stavropoulos, Edison, NJ (US); Alexander Topchy, New Port Richey, FL (US); John Zoldos, Albany, OR (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,765

(22) Filed: Sep. 29, 2023

(65) Prior Publication Data

US 2024/0031647 A1 Jan. 25, 2024

Related U.S. Application Data

(63) Continuation of application No. 17/448,343, filed on Sep. 21, 2021, now Pat. No. 11,812,104.

(51) Int. Cl.
*H04N 21/442* (2011.01)
*H04L 67/50* (2022.01)
*H04L 67/54* (2022.01)
*H04N 21/439* (2011.01)
*H04N 21/8358* (2011.01)

(52) U.S. Cl.
CPC ..... *H04N 21/44218* (2013.01); *H04L 67/535* (2022.05); *H04L 67/54* (2022.05); *H04N 21/4394* (2013.01); *H04N 21/8358* (2013.01)

(58) Field of Classification Search
CPC ........ H04N 21/44218; H04N 21/4394; H04N 21/8358; H04N 21/44222; H04L 67/535; H04L 67/54; H04L 51/10; H04L 51/043
USPC .......................................................... 725/14
See application file for complete search history.

(56) References Cited

U.S. PATENT DOCUMENTS

2016/0050456 A1* 2/2016 Arini ................ H04N 21/44204
725/10
2016/0241910 A1* 8/2016 Rowe ............... H04N 21/41265

* cited by examiner

*Primary Examiner* — Adil Ocak

(57) ABSTRACT

Methods, apparatus, systems, and articles of manufacture are disclosed to detect a presence status. An example apparatus includes media identification circuitry to generate first signatures representative of first audio data associated with a monitored media device, a comparator to obtain second signatures from a portable meter, the second signatures representative of second audio data sensed by the portable meter and compare the first signatures and the second signatures to determine a comparison result, presence detection circuitry to determine a presence status of a user based on the comparison result, the user associated with the portable meter, and network communication circuitry to transmit the presence status to a data processor to perform audience measurement based on the presence status.

20 Claims, 17 Drawing Sheets

METHODS AND APPARATUS TO DETECT A PRESENCE STATUS

CROSS REFERENCE TO RELATED APPLICATIONS

This disclosure is a continuation of and claims priority to U.S. patent application Ser. No. 17/448,343, now U.S. Pat. No. 11,812,104, filed Sep. 21, 2021, which is incorporated by reference in its entirety.

FIELD OF THE DISCLOSURE

This disclosure relates generally to audience monitoring and, more particularly, to methods and apparatus to detect a presence status.

BACKGROUND

Media monitoring companies, also referred to as audience measurement entities, monitor user interaction with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

Figure 1:
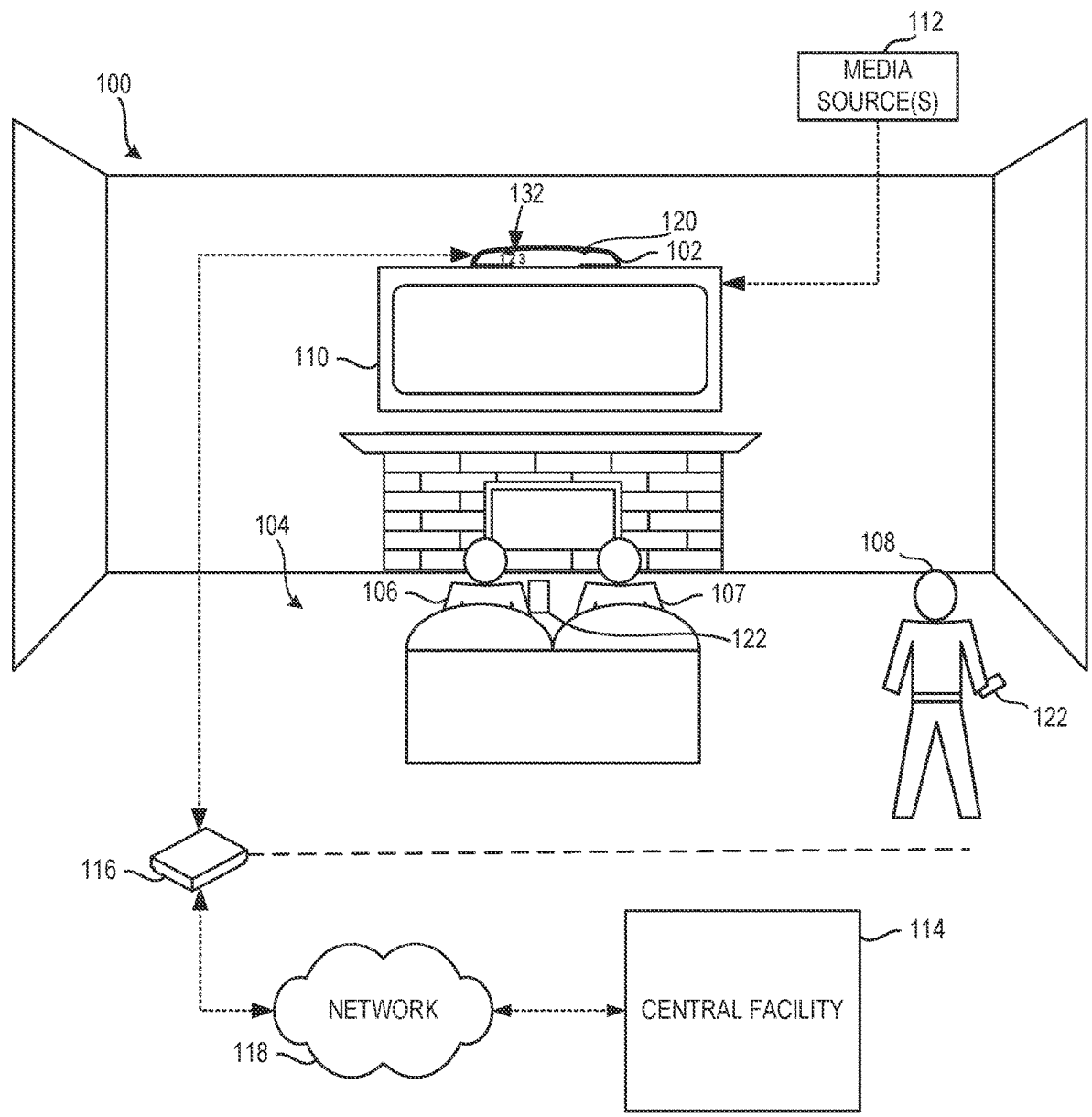
FIG. 1 illustrates an example audience measurement system having an example device meter to monitor an example media presentation environment.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

At least some meters that perform media monitoring, such as the meters described above, implement media identification features and people identification features. Such features (e.g., media identification and people identification) enable the generation of media monitoring information that can be used for determining audience exposure (also referred to as user exposure) to advertisements, determining advertisement effectiveness, determining user behavior relative to media, identifying the purchasing behavior associated with various demographics, etc. The people identification features of the meter determine the audience in a media presentation environment. For example, the people identification feature may be implemented by active people meters, passive people meters, and/or a combination of active people meters and passive people meters to determine a people count.

An active people meter obtains a people count by actively prompting an audience to enter information for audience member identification. In some examples, an active people meter identifies an audience member by the audience member's assigned panelist number or visitor number. For example, the active people meter obtains the assigned panelist number or visitor number through a communication channel. In some examples, the active people meter pairs the information corresponding to the audience input with a household (e.g., a specific media environment) and with the corresponding demographic data for the people of that household. In some examples, the active people meter validates viewership (e.g., the number of audience members viewing media in the media environment) at a set interval. For example, the active people meter generates a prompting message for the audience members to verify that they are still in the audience. In this manner, the active people meter relies on audience compliance. In some examples, maintaining audience compliance is a challenge. For example, audience members may incorrectly enter the number of people viewing the media and/or they may miss the prompting messages generated by the active people meter.

A passive people meter obtains audience information passively, for example, by capturing images of the audience using a camera and then employing facial recognition to identify the individual audience members included in the audience. In some examples, image processing for facial recognition can be processor intensive. Additionally, facial recognition algorithms can take a substantial amount of time to reliably recognize people in an image.

To enable an accurate and less invasive method of media monitoring, example methods and apparatus disclosed herein utilize a combination of a passive people meter and an active people meter. Example techniques disclosed herein include comparing device meter data to portable meter data. Disclosed example techniques also include determining a match score based on the comparison. Disclosed example techniques further include determining the presence status of audience members based on the match score.

FIG. 1 is an illustration of an example audience measurement system 100 having an example device meter 102 to monitor an example media presentation environment 104. In the illustrated example of FIG. 1, the media presentation environment 104 includes panelists 106, 107, and 108, an example media device 110 that receives media from an example media source 112, and the device meter 102. The device meter 102 identifies the media presented by the media device 110 and reports media monitoring information to an example central facility 114 of an audience measurement entity via an example gateway 116 and an example network 118. The example device meter 102 of FIG. 1 sends media monitoring data and/or audience monitoring data to the central facility 114 periodically, a-periodically and/or upon request by the central facility 114. In some examples, the device meter 102 is a stationary. In some examples, the device meter 102 is portable.

In the illustrated example of FIG. 1, the media presentation environment 104 is a room of a household (e.g., a room in a home of a panelist, such as the home of a "Nielsen family") that has been statistically selected to develop media (e.g., television) ratings data for a population/demographic of interest. In the illustrated example of FIG. 1, the example panelists 106, 107, and 108 of the household have been statistically selected to develop media ratings data (e.g., television ratings data) for a population/demographic of interest. People become panelists via, for example, a user interface presented on a media device (e.g., via the media device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example, one or more panelists 106, 107, and 108 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 104 is a household, the example media presentation environment 104 can additionally or alternatively be any other type(s) of environments such as, for example, a theater, a restaurant, a tavern, a retail location, an arena, etc.

In the illustrated example of FIG. 1, the example media device 110 is a television. However, the example media device 110 can correspond to any type of audio, video, and/or multimedia presentation device capable of presenting media audibly and/or visually. In some examples, the media device 110 (e.g., a television) may communicate audio to another media presentation device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory such as a digital video recorder or a digital versatile disc, a webpage, and/or any other communication device capable of presenting media to an audience (e.g., the panelists 106, 107, and 108).

The media source 112 may be any type of media provider(s), such as, but not limited to, a cable media service provider, a radio frequency (RF) media provider, an Internet based provider (e.g., IPTV), a satellite media service provider, etc. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc.

The example media device 110 of the illustrated example shown in FIG. 1 is a device that receives media from the media source 112 for presentation. In some examples, the media device 110 is capable of directly presenting media (e.g., via a display) while, in other examples, the media device 110 presents the media on separate media presentation equipment (e.g., speakers, a display, etc.). Thus, as used herein, "media devices" may or may not be able to present media without assistance from a second device. Media devices are typically consumer electronics. For example, the media device 110 of the illustrated example could be a personal computer such as a laptop computer, and, thus, capable of directly presenting media (e.g., via an integrated and/or connected display and speakers). In some examples, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, etc. Advertising, such as an advertisement and/or a preview of other programming that is or will be offered by the media source 112, etc., is also typically included in the media. While a television is shown in the illustrated example, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example device meter 102 detects exposure to media and electronically stores monitoring information (e.g., a code/watermark detected with the presented media, a signature of the presented media, an identifier of a panelist present at the time of the presentation, a timestamp of the time of the presentation) of the presented media. The stored monitoring information is then transmitted back to the central facility 114 via the gateway 116 and the network 118. While the media monitoring information is transmitted by electronic transmission in the illustrated example of FIG. 1, the media monitoring information may additionally or alternatively be transferred in any other manner, such as, for example, by physically mailing the device meter 102, by physically mailing a memory of the device meter 102, etc.

The device meter 102 of the illustrated example of FIG. 1 combines media measurement data and people metering data. For example, media measurement data is determined by monitoring media output by the media device 110 and/or other media presentation device(s), and people metering data (also referred to as demographic data, people monitoring data, etc.) is determined by monitoring people with the device meter 102. Thus, the example device meter 102 provides dual functionality of a media meter to collect content media data and a people meter to collect and/or associate demographic information corresponding to the collected media measurement data.

For example, the device meter 102 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media device 110. To extract media identification data, the device meter 102 and/or the example audience measurement system 100 extracts and/or processes the collected media identifying information and/or data received by the device meter 102, which can be compared to reference data to perform source and/or content identification. Any other type(s) and/or number of media monitoring techniques can be supported by the device meter 102.

Depending on the type(s) of metering the device meter 102 is to perform, the device meter 102 can be physically coupled to the media device 110 or may be configured to capture signals emitted externally by the media device 110 (e.g., free field audio) such that direct physical coupling to the media device 110 is not required. For example, the device meter 102 of the illustrated example may employ non-invasive monitoring not involving any physical connection to the media device 110 (e.g., via Bluetooth® connection, WIFI® connection, acoustic watermarking, etc.) and/or invasive monitoring involving one or more physical connections to the media device 110 (e.g., via USB connection, a High Definition Media Interface (HDMI) connection, an Ethernet cable connection, etc.).

In examples disclosed herein, to monitor media presented by the media device 110, the device meter 102 of the illustrated example employs audio watermarking techniques and/or signature based-metering techniques. Audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component of the media. In some examples, the audio or video component is selected to have a signal characteristic sufficient to hide the watermark. As used herein, the terms "code" and "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

For example, the device meter 102 of the illustrated example senses audio (e.g., acoustic signals or ambient audio) output (e.g., emitted) by the media device 110. For example, the device meter 102 processes the signals obtained from the media device 110 to detect media and/or source identifying signals (e.g., audio watermarks) embedded in portion(s) (e.g., audio portions) of the media presented by the media device 110. To sense ambient audio output by the media device 110, the device meter 102 of the illustrated example includes an audio sensor (e.g., a microphone). In some examples, the device meter 102 may process audio signals obtained from the media device 110 via a direct cable connection to detect media and/or source identifying audio watermarks embedded in such audio signals. In some examples, the device meter 102 may process audio signals and/or video signals to generate respective audio and/or video signatures from the media presented by the media device 110.

To generate exposure data for the media, identification(s) of media to which the audience is exposed are correlated with people data (e.g., presence information) collected by the device meter 102. The device meter 102 of the illustrated example collects inputs (e.g., audience monitoring data) representative of the identities of the audience member(s) (e.g., the panelists 106, 107, and 108). In some examples, the device meter 102 collects audience monitoring data by periodically or a-periodically prompting audience members in the monitored media presentation environment 104 to identify themselves as present in the audience (e.g., audience identification information). In some examples, the device meter 102 responds to events (e.g., when the media device 110 is turned on, a channel is changed, an infrared control signal is detected, etc.) by prompting the audience member(s) to self-identify.

The example audio sensor 120 of the illustrated example of FIG. 1 is a microphone. The example audio sensor 120 receives ambient sound (e.g., free field audio) including audible media and/or sounds from audience members in the vicinity of the device meter 102. Additionally or alternatively, the example audio sensor 120 may be implemented by a line input connection. The line input connection may allow an external microphone to be used with the device meter 102 and/or, in some examples, may enable the audio sensor 120 to be directly connected to an output of a media device 110 (e.g., an auxiliary output of a television, an auxiliary output of an audio/video receiver of a home entertainment system, etc.).

In some examples, the device meter 102 is positioned in a location such that the audio sensor 120 receives ambient audio produced by the television and/or other devices of the media presentation environment 104 (FIG. 1) with sufficient quality to identify media presented by the media device 110 and/or other devices of the media presentation environment 104 (e.g., a surround sound speaker system). For example, in examples disclosed herein, the device meter 102 may be placed on top of the television, secured to the bottom of the television, etc. While the illustrated example of FIG. 1 includes the audio sensor 120, examples disclosed herein can additionally or alternatively use multiple audio sensors.

The audience monitoring data and the exposure data can then be compiled with the demographic data collected from audience members such as, for example, the panelists 106, 107, and 108 during registration to develop metrics reflecting, for example, the demographic composition of the audience. The demographic data includes, for example, age, gender, income level, educational level, marital status, geographic location, race, etc., of the panelist.

In some examples, the device meter 102 may be configured to receive audience information via an example portable meter 122 such as, for example, a remote control, an Apple iPad®, a cell phone, a wearable device, etc. In such examples, the device meter 102 prompts the audience members to indicate their presence by pressing an appropriate input key on the portable meter 122. For example, the portable meter 122 may enable the audience member(s) (e.g., the panelists 106, 107, and 108 of FIG. 1) and/or an unregistered user (e.g., a visitor to a panelist household) to input information to the device meter 102 of FIG. 1. This information includes registration data to configure the device meter 102 and/or demographic data to identify the audience member(s). For example, the portable meter 122 may include a gender input interface, an age input interface, and a panelist identification input interface, etc. Although FIG. 1 illustrates multiple portable meters 122, the example media presentation environment 104 may include a portable meter 122 with multiple inputs for multiple audience members. For example, the portable meter 122 can be utilized as a household input device where panelists of the household may each have a corresponding input assigned to them.

The example gateway 116 of the illustrated example of FIG. 1 is a router that enables the device meter 102 and/or other devices in the media presentation environment (e.g., the media device 110) to communicate with the network 118 (e.g., the Internet). In some examples, the example gateway 116 facilitates delivery of media from the media source 112 to the media device 110 via the Internet. In some examples, the example gateway 116 includes gateway functionality, such as modem capabilities. In some other examples, the example gateway 116 is implemented in two or more devices (e.g., a router, a modem, a switch, a firewall, etc.). The gateway 116 of the illustrated example may communicate with the network 118 via Ethernet, a digital subscriber line (DSL), a telephone line, a coaxial cable, a USB connection, a Bluetooth connection, any wireless connection, etc.

In some examples, the example gateway 116 hosts a Local Area Network (LAN) for the media presentation environment 104. In the illustrated example, the LAN is a wireless local area network (WLAN), and allows the device meter 102, the media device 110, etc. to transmit and/or receive data via the Internet. Alternatively, the gateway 116 may be coupled to such a LAN. In some examples, the gateway 116 may be implemented with the example device meter 102 disclosed herein. In some examples, the gateway 116 may not be provided. In some such examples, the device meter 102 may communicate with the central facility 114 via cellular communication (e.g., the device meter 102 may employ a built-in cellular modem).

The network 118 of the illustrated example is a wide area network (WAN) such as the Internet. However, in some examples, local networks may additionally or alternatively be used. Moreover, the example network 118 may be implemented using any type of public or private network, such as, but not limited to, the Internet, a telephone network, a local area network (LAN), a cable network, and/or a wireless network, or any combination thereof.

The central facility 114 of the illustrated example is implemented by one or more servers. The central facility 114 processes and stores data received from the device meter 102. For example, the example central facility 114 of FIG. 1 combines audience monitoring data and program identification data from multiple households to generate aggregated media monitoring information. The central facility 114 generates reports for advertisers, program producers and/or other interested parties based on the compiled statistical data. Such reports include extrapolations about the size and demographic composition of audiences of content, channels and/or advertisements based on the demographics and behavior of the monitored panelists.

As noted above, the device meter 102 of the illustrated example provides a combination of media (e.g., content) metering and people metering. In the illustrated example, the device meter 102 of FIG. 1 is a stationary device that may be disposed on or near the media device 110. The device meter 102 of FIG. 1 includes its own housing, processor, memory and/or software to perform the desired audience measurement and/or people monitoring functions.

In examples disclosed herein, an audience measurement entity provides the device meter 102 to the panelist 106, 107, and 108 (or household of panelists) such that the device meter 102 may be installed by the panelist 106, 107 and 108 by simply powering the device meter 102 and placing the device meter 102 in the media presentation environment 104 and/or near the media device 110 (e.g., near a television set). In some examples, more complex installation activities may be performed such as, for example, affixing the device meter 102 to the media device 110, electronically connecting the device meter 102 to the media device 110, etc.

To identify and/or confirm the presence of a panelist present in the media device 110, the example device meter 102 of the illustrated example includes an example display 132. For example, the display 132 provides identification of the panelists 106, 107, 108 present in the media presentation environment 104. For example, in the illustrated example, the device meter 102 displays indicia or visual indicators (e.g., illuminated numerals 1, 2 and 3) identifying and/or confirming the presence of the first panelist 106, the second panelist 107, and the third panelist 108.

In some examples, the device meter 102 transmits a prompt to the example portable meters 122. For example, the device meter 102 prompts the portable meters 122 for portable meter data (e.g., monitoring information generated by the portable meters 122). In some examples, the device meter 102 transmits the portable meter data and/or the device meter data to the central facility 114. Additionally or alternatively, the example device meter 102 compares the portable meter data and the device meter data to generate a match value. For example, the match value represents an amount of similarity between the monitoring information generated by the portable meters 122 and the device meter 102. The example device meter 102 generates presence status data based on the match value. For example, the presence status data includes the presence status for the audience members (e.g., the panelists 106, 107, 108). The example device meter 102 transmits the presence status data to the central facility 114. An example implementation of the device meter 102 is described below in conjunction with FIG. 2.

In some examples, the example portable meters 122 generate presence status data. For example, the portable meters 122 generate portable meter data and obtain device meter data generated by the device meter 102. The example portable meters 122 compare the portable meter data and the device meter data to generate a match value. The example portable meters 122 generate presence status data based on the match value. The example portable meters 122 transmit the presence status data to the device meter 102. An example implementation of the portable meters 122 is described below in conjunction with FIG. 3.

In some examples, the central facility 114 generates presence status data. For example, the central facility 114 obtains reported data from the device meter 102. In some examples, the reported data includes presence status data (e.g., generated by the device meter 102 and/or the portable meters 122). Additionally or alternatively, the reported data does not include presence status data. That is, the reported data includes device meter data and the portable meter data. In some such examples, the example central facility 114 compares the portable meter data and the device meter data to generate a match value. The example central facility 114 generates and stores presence status data based on the match value. An example implementation of the central facility 114 is described below in conjunction with FIG. 4.

Figure 2:
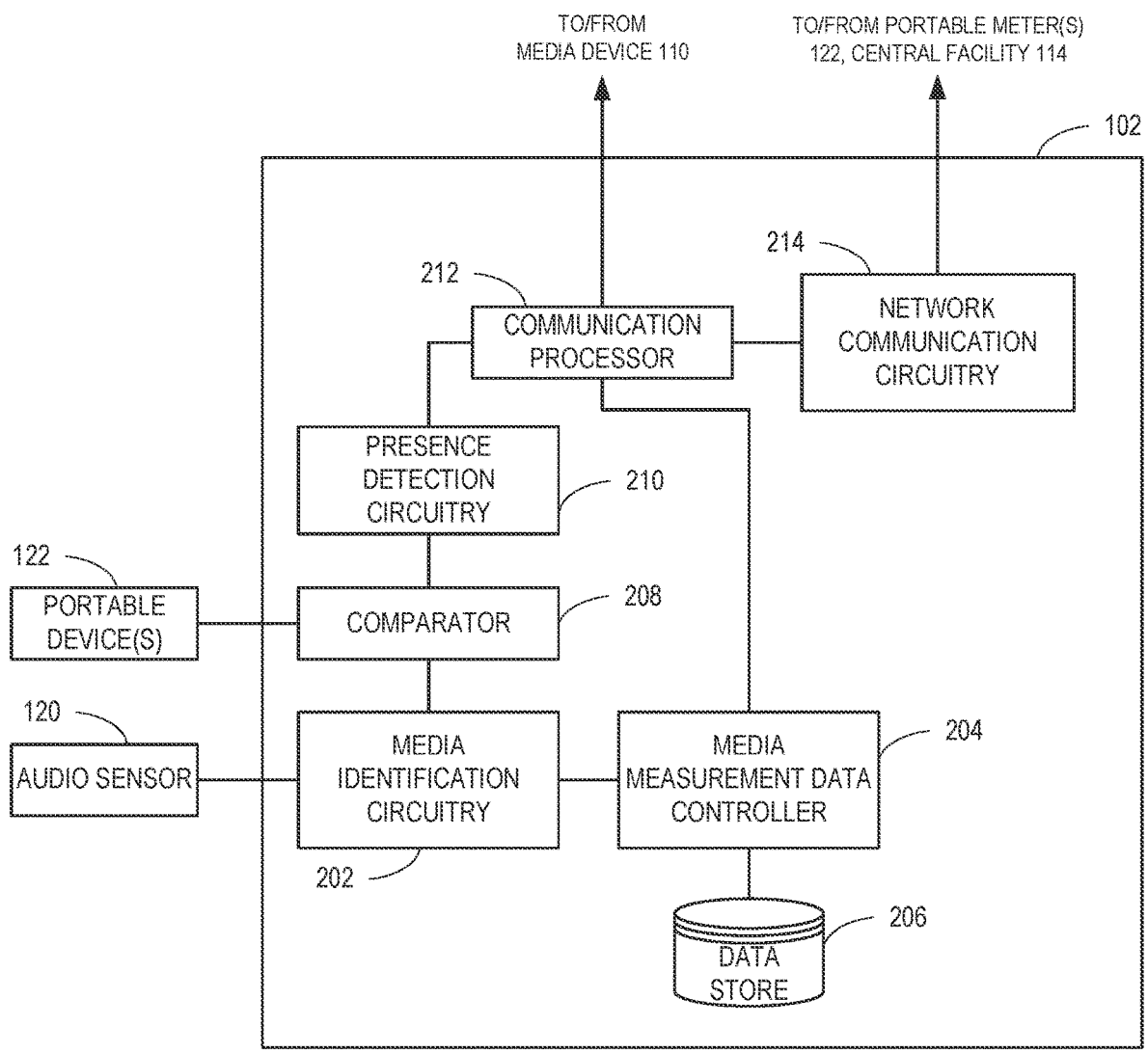
FIG. 2 illustrates a block diagram of the example device meter of FIG. 1.

FIG. 2 illustrates a block diagram of the example device meter 102 of FIG. 1 to generate media monitoring data and presence status data. The example device meter 102 of FIG. 2 is coupled to the example audio sensor 120 (FIG. 1) to obtain monitoring information based on samples of audio data. The example device meter 102 is in communication with the example portable meter(s) 122 (FIG. 1) to obtain monitoring information associated with the audience member(s) (e.g., the panelists 106, 107, and 108 of FIG. 1). The example device meter 102 of FIG. 2 includes example media identification circuitry 202, an example media measurement data controller 204, an example data store 206, an example comparator 208, example presence detection circuitry 210, an example communication processor 212, and example network communication circuitry 214.

The example media identification circuitry 202 analyzes audio received via the audio sensor 120. The example media identification circuitry 202 of the illustrated example outputs an identifier of the media (e.g., media-identifying information) to the media measurement data controller 204. That is, the media identification circuitry 202 generates device meter data. For example, the media identification circuitry 202 utilizes audio and/or video watermarking techniques to generate monitoring information. Additionally or alternatively, the media identification circuitry 202 utilizes signature-based media identification techniques. For example, the media identification circuitry 202 generates one or more signatures of the audio received from the audio sensor 120.

The example media measurement data controller 204 of the illustrated example of FIG. 2 receives media identifying information (e.g., a code, a signature, etc.) from the media identification circuitry 202 and stores the received information in the data store 206. The example media measurement data controller 204 periodically and/or a-periodically transmits, via the network communication circuitry 214, the media measurement information stored in the data store 206 to the central facility 114 for post-processing of media measurement data, aggregation and/or preparation of media monitoring reports. In some examples, the media measurement data controller 204 generates exposure data. For example, the media measurement data controller 204 correlates the media identifying information with audience monitoring data, as described above, to generate exposure data.

The example data store 206 of the illustrated example of FIG. 2 may be implemented by any device for storing data such as, for example, flash memory, magnetic media, optical media, etc. Furthermore, the data stored in the example data store 206 may be in any data format such as, for example, binary data, comma delimited data, tab delimited data, structured query language (SQL) structures, etc. In the illustrated example, the example data store 206 stores media identifying information collected by the media identification circuitry 202.

The example comparator 208 compares monitoring information. That is, the example comparator 208 determines whether the monitoring information generated by the media identification circuitry 202 and the portable meter(s) 122 match. For example, the comparator 208 obtains monitoring information generated by the media identification circuitry 202 and monitoring information generated by the example portable meter(s) 122. In some examples, the comparator 208 generates a first comparison result by comparing signatures generated by the media identification circuitry 202 and the portable meter(s) 122. Additionally or alternatively, the comparator 208 generates a second comparison result by comparing watermarks detected by the media identification circuitry 202 and the portable meter(s) 122. For example, the comparator 208 compares monitoring information corresponding to the same and/or substantially the same timestamp to generate the comparison result(s). In some examples, the comparison result(s) represent a degree of similarity between the monitoring information. For example, the comparator 208 determines the monitoring information matches if the comparison result satisfies a match threshold. For example, the match threshold may specify a number of matched watermarks per monitoring interval (e.g., per a 15 second interval, per a 30 second interval, per a 1 minute interval, etc.) that, if satisfied when comparing the device meter watermarks detected by the media identification circuitry 202 and the portable meter watermarks reported by a portable meter 122, indicates that one or more persons/users associated with (e.g., assigned to, logged into, etc.) the portable meter 122 are present. As another example, the match threshold may specify a number of matched signatures per monitoring interval (e.g., per a 15 second interval, per a 30 second interval, per a 1 minute interval, etc.) that, if satisfied when comparing the device meter signatures generated by the media identification circuitry 202 and the portable meter signatures reported by a portable meter 122, indicates that one or more persons/users associated with (e.g., assigned to, logged into, etc.) the portable meter 122 are present.

The example presence detection circuitry 210 determines a presence status of audience members based on the comparison result(s). For example, the presence detection circuitry 210 determines whether an audience member (e.g., the panelists 106, 107, 108) is present in the media presentation environment 104. In some examples, the presence status corresponds to whether a panelist is logged in or logged out. However, in some examples, the presence status corresponds to whether a panelist is in (or, more generally, associated with) a certain location, etc.

The example presence detection circuitry 210 generates a match value. For example, the presence detection circuitry 210 determines the match value based on the comparison result(s) generated by the comparator 208. In some examples, the presence detection circuitry 210 augments (e.g., weights) the match value based on characteristic(s) of radio frequency signal(s) (e.g., Wi-Fi signals, etc.) of the portable meters 122 received by the device meter 102. For example, the device meter 102 may determine whether the strength of a radio frequency signal (e.g., the strength of a Bluetooth signal between the portable meter 122 and the device meter 102, etc.) received from a portable meter 122 satisfies a signal threshold, etc. In some examples, the presence detection circuitry 210 weights the value of the comparison result(s) from the comparator 208 based on the measured signal strength by a first value (e.g., a value greater than 1 and proportional to the signal strength, or some other value) if the signal strength satisfies the threshold, or by a second value (e.g., a value of 1 or some other value) if the signal strength satisfies the threshold, to determine the match value. In the illustrated example, the presence detection circuitry 210 determines the presence status of an audience member is "present" in response to the match value satisfying a presence threshold. In some examples, the presence detection circuitry 210 determines the presence status is "absent" in response to the match value not satisfying the presence threshold. In some examples, the presence threshold may be the same as the match threshold, whereas in some examples, the presence threshold may be different from (e.g., greater than or less than) the match threshold.

In some examples disclosed herein, the example presence detection circuitry 210 includes a model controller to train a model to learn about the corresponding household media environment. As used herein, a model is a description of an environment using mathematical concepts and language. A model is generally composed of relationships and variables, the relationships describing operators (e.g., such as algebraic operators, functions, etc.) and the variables describing monitored environment parameters of interest that can be quantified. In some examples, the model is a machine learning and/or artificial intelligence (AI) model such as a Linear Regression model, a decision tree, a support vector machine (SVM) model, a Naïve Bayes model, etc. In some examples, the presence detection circuitry 210 generates a feature vector corresponding to the meter data. The example presence detection circuitry 210 utilizes the feature vector to train the model. For example, the feature vector includes data representative of descriptive characteristics of a physical environment (e.g., the household media environment). In some examples, such data includes a date and time, a number and/or identification of audience members present in the media environment, a media source (e.g., radio media, television media, pay per view media, movies, Internet Protocol Television (IPTV), satellite television (TV), Internet radio, satellite radio, digital television), a media channel (e.g., broadcast channel, a domain name), and the demographics of the audience members. In this manner, the example presence detection circuitry 210 can generate the model to learn who will be in the audience and at what time. Eventually, when training is complete, the model can be deployed at the device meter 102 and utilized to make informed decisions about the audience composition.

The example communication processor 212 of the illustrated example of FIG. 2 receives information from the network communication circuitry 214 and performs actions based on that received information. For example, the communication processor 212 packages records corresponding to collected exposure data and transmits records to the central facility 114. In examples disclosed herein, the communication processor 212 communicates with the media measurement data controller 204 and/or the presence detection circuitry 210 to transmit the presence status, demographic data, etc., to the network communication circuitry 214.

The example network communication circuitry 214 of the illustrated example of FIG. 2 is a communication interface configured to receive and/or otherwise transmit corresponding communications to and/or from the central facility 114. In the illustrated example, the network communication circuitry 214 facilitates wired communication via an Ethernet network hosted by the example gateway 116 of FIG. 1.

In some examples, the network communication circuitry 214 is implemented by a Wi-Fi radio that communicates via the LAN hosted by the example gateway 116. In some examples disclosed herein, any other type of wireless transceiver may additionally or alternatively be used to implement the network communication circuitry 214. In examples disclosed herein, the example network communication circuitry 214 communicates information to the communication processor 212 which performs actions based on the received information. In some examples disclosed herein, the network communication circuitry 214 may transmit media measurement information provided by the media measurement data controller 204 (e.g., data stored in the data store 206) to the central facility 114 of the media presentation environment 104.

In some examples, the device meter 102 does not include the comparator 208 and/or the presence detection circuitry 210. That is, the device meter 102 may not generate presence status data of audience members. In some such examples, the device meter 102 obtains presence status data generated by the portable meters 122. Additionally or alternatively, the device meter 102 obtains portable meter data and transmits the portable meter data and the device meter data to the central facility for media monitoring and/or presence detection.

Figure 3:
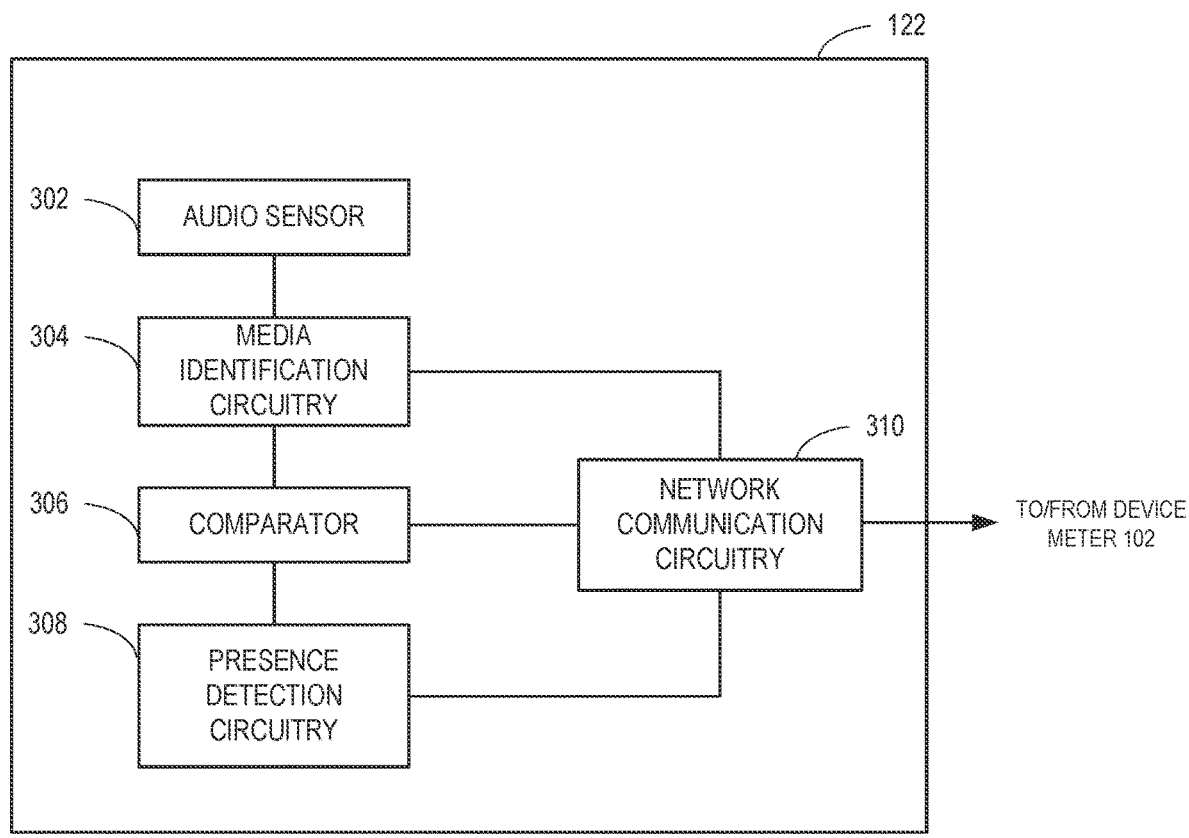
FIG. 3 illustrates a block diagram of an example portable meter of FIG. 1.

FIG. 3 illustrates a block diagram of the example portable meter 122 of FIG. 1. The example portable meter 122 includes an example audio sensor 302, example media identification circuitry 304, an example comparator 306, example presence detection circuitry 308, and example network communication circuitry 310.

The example audio sensor 302 records the media environment and records samples of audio data. The example audio sensor 302 of the illustrated example of FIG. 3 is a microphone. For example, the audio sensor 302 records samples of audio data associated with the audience members (e.g., the panelists 106, 107, 108 of FIG. 1) of the media presentation environment 104 (FIG. 1). In some examples, the device meter 102 responds to events (e.g., when the media device 110 is turned on, a channel is changed, an infrared control signal is detected, etc.) by prompting the portable meter 122 to cause the audio sensor 302 to record audio samples. The example audio sensor 302 receives ambient sound (e.g., free field audio) including audible media and/or sounds from audience members in the vicinity of the device meter 102. Additionally or alternatively, the example audio sensor 302 may be implemented by a line input connection. The line input connection may allow an external microphone to be used with the portable meter 122 and/or, in some examples, may enable the audio sensor 302 to be directly connected to an output of a media device 110 (e.g., an auxiliary output of a television, an auxiliary output of an audio/video receiver of a home entertainment system, etc.).

The example media identification circuitry 304 analyzes audio collected by the audio sensor 302. That is, the media identification circuitry 304 generates monitoring information (e.g., portable meter data). In some examples, the media identification circuitry 304 utilizes audio and/or video watermarking techniques to generate monitoring information. Additionally or alternatively, the media identification circuitry 304 utilizes signature-based media identification techniques. For example, the media identification circuitry 304 generates one or more signatures of the audio collected by the audio sensor 302.

The example comparator 306 compares monitoring information. That is, the example comparator 306 determines whether the monitoring information generated by the media identification circuitry 304 and the device meter 102 match. For example, the comparator 306 obtains monitoring information generated by the media identification circuitry 304 and monitoring information generated by the example device meter 102. In some examples, the comparator 306 generates a first comparison result by comparing signatures generated by the media identification circuitry 304 and the device meter 102. Additionally or alternatively, the comparator 306 generates a second comparison result by comparing watermarks detected by the media identification circuitry 304 and the device meter 102. For example, the comparator 306 compares monitoring information corresponding to the same and/or substantially the same timestamp to generate a comparison result. In some examples, the comparison result(s) represent a degree of similarity between the monitoring information. For example, the comparator 306 determines the monitoring information matches if the comparison result(s) satisfy a match threshold. For example, the match threshold may specify a number of matched watermarks per monitoring interval (e.g., per a 15 second interval, per a 30 second interval, per a 1 minute interval, etc.) that, if satisfied when comparing the portable meter watermarks detected by the media identification circuitry 304 and the device meter watermarks reported by a device meter 102, indicates that one or more persons/users associated with (e.g., assigned to, logged into, etc.) the portable meter 122 are present. As another example, the match threshold may specify a number of matched signatures per monitoring interval (e.g., per a 15 second interval, per a 30 second interval, per a 1 minute interval, etc.) that, if satisfied when comparing the portable meter signatures generated by the media identification circuitry 304 and the device meter signatures reported by a device meter 102, indicates that one or more persons/users associated with (e.g., assigned to, logged into, etc.) the portable meter 122 are present.

The example presence detection circuitry 308 determines a presence status of audience members. For example, the presence detection circuitry 308 determines whether an audience member (e.g., the panelists 106, 107, 108) is present in the media presentation environment 104. In some examples, the presence detection circuitry 308 generates a match value. For example, the presence detection circuitry 308 determines the match value based on the comparison result(s) generated by the comparator 306. In some examples, the presence detection circuitry 308 augments (e.g., weights) the match value based on characteristic(s) of radio frequency signal(s) (e.g., Wi-Fi signals, etc.) of the device meter 102 received by the portable meter(s) 122. For example, the portable meter(s) 122 may determine whether the strength of a radio frequency signal (e.g., the strength of a Bluetooth signal between the portable meter 122 and the device meter 102, etc.) received from the device meter 102 satisfies a signal threshold, etc. In some examples, the presence detection circuitry 308 weights the value of the comparison result(s) from the comparator 306 based on the measured signal strength by a first value (e.g., a value greater than 1 and proportional to the signal strength, or some other value) if the signal strength satisfies the threshold, or by a second value (e.g., a value of 1 or some other value) if the signal strength satisfies the threshold, to determine the match value. The example presence detection circuitry 308 determines the presence status of an audience member is "present" in response to the match value satisfying a presence threshold. In some examples, the presence detection circuitry 308 determines the presence status is "absent" in response to the match value not satisfying the threshold. In some examples, the presence threshold may be the same as the match threshold, whereas in some examples, the presence threshold may be different from (e.g., greater than or less than) the match threshold.

In some examples disclosed herein, the example presence detection circuitry 308 includes a model controller to train a model to learn about the corresponding household media environment. As used herein, a model is a description of an environment using mathematical concepts and language. A model is generally composed of relationships and variables, the relationships describing operators (e.g., such as algebraic operators, functions, etc.) and the variables describing monitored environment parameters of interest that can be quantified. In some examples, the model is a machine learning and/or artificial intelligence (AI) model such as a Linear Regression model, a decision tree, a support vector machine (SVM) model, a Naïve Bayes model, etc. In some examples, the presence detection circuitry 308 generates a feature vector corresponding to the meter data. The example presence detection circuitry 308 utilizes the feature vector to train the model. For example, the feature vector includes data representative of descriptive characteristics of a physical environment (e.g., the household media environment). In some examples, such data includes a date and time, a number and/or identification of audience members present in the media environment, a media source (e.g., radio media, television media, pay per view media, movies, Internet Protocol Television (IPTV), satellite television (TV), Internet radio, satellite radio, digital television), a media channel (e.g., broadcast channel, a domain name), and the demographics of the audience members. In this manner, the example presence detection circuitry 308 can generate the model to learn who will be in the audience and at what time. Eventually, when training is complete, the model can be deployed at the portable meter 122 and utilized to make informed decisions about the audience composition.

The example network communication circuitry 310 of the illustrated example of FIG. 3 is a communication interface configured to receive and/or otherwise transmit corresponding communications to and/or from the device meter 102. In examples disclosed herein, the network communication circuitry 310 may transmit portable meter data and/or presence status data to the device meter 102 of FIG. 1.

In some examples, the portable meter 122 does not include the comparator 306 and/or the presence detection circuitry 308. That is, the portable meter 122 may not detect presence statuses of audience members. In some such examples, the portable meter 122 generates monitoring information and transmits the monitoring information to the device meter 102 for media monitoring and/or presence detection.

Figure 4:
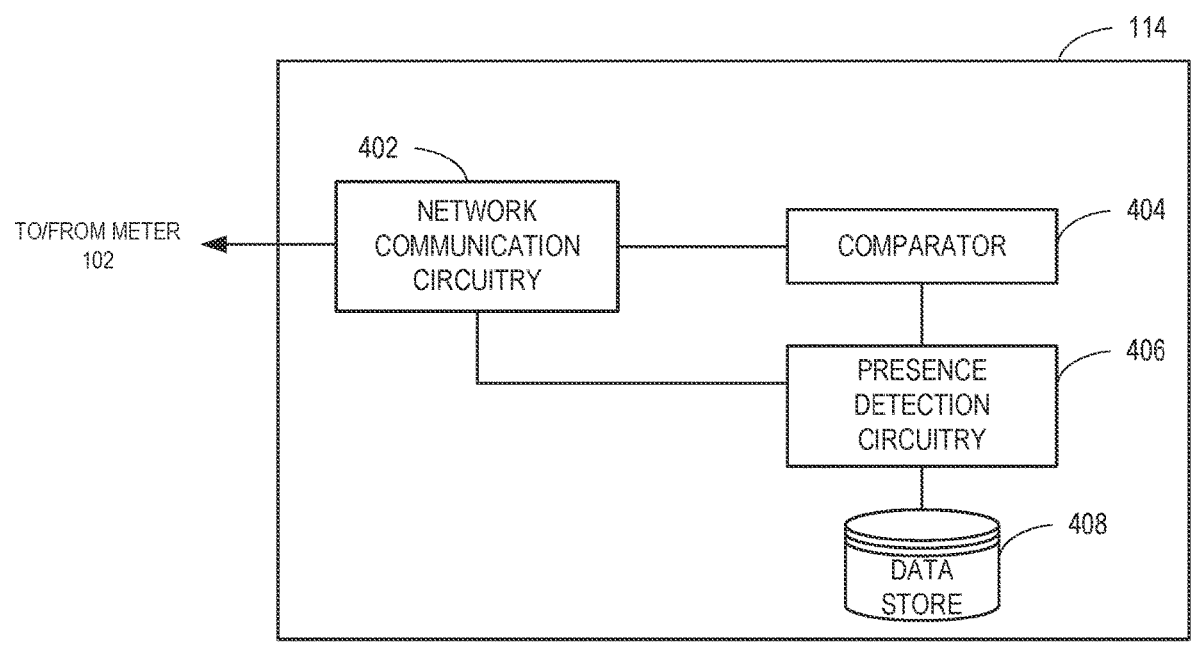
FIG. 4 illustrates a block diagram of an example central facility of FIG. 1.

FIG. 4 illustrates a block diagram of the example central facility 114 of FIG. 1. The example central facility 114 of FIG. 4 includes example network communication circuitry 402, an example comparator 404, example presence detection circuitry 406, and an example data store 408.

The example network communication circuitry 402 of the illustrated example of FIG. 4 is a communication interface configured to receive and/or otherwise transmit corresponding communications to and/or from the device meter 102. In examples disclosed herein, the example network communication circuitry 402 communicates information to the comparator 404 which performs actions based on the received information. In other examples disclosed herein, the network communication circuitry 402 may obtain reported data provided by the device meter 102. For example, the network communication circuitry 402 obtains meter data (e.g., signatures and/or codes) generated by the device meter 102 and/or the portable meter(s) 122.

The example comparator 404 compares monitoring information. That is, the example comparator 404 determines whether the monitoring information generated by the device meter 102 and the portable meter(s) 122 match. In some examples, the comparator 404 generates a first comparison result by comparing signatures generated by the device meter 102 and the portable meter(s) 122. Additionally or alternatively, the comparator 404 generates a second comparison result by comparing watermarks detected by the device meter 102 and the portable meter(s) 122. For example, the comparator 404 compares monitoring information corresponding to the same and/or substantially the same timestamp to generate a comparison result. In some examples, the comparison result(s) represent a degree of similarity between the monitoring information. For example, the comparator 306 determines the monitoring information matches if the comparison result(s) satisfy a match threshold. For example, the match threshold may specify a number of matched watermarks per monitoring interval (e.g., per a 15 second interval, per a 30 second interval, per a 1 minute interval, etc.) that, if satisfied when comparing the portable meter watermarks reported by the portable meter 122 and the device meter watermarks reported by a device meter 102, indicates that one or more persons/users associated with (e.g., assigned to, logged into, etc.) the portable meter 122 are present. As another example, the match threshold may specify a number of matched signatures per monitoring interval (e.g., per a 15 second interval, per a 30 second interval, per a 1 minute interval, etc.) that, if satisfied when comparing the portable meter signatures reported by the portable meter 122 and the device meter signatures reported by a device meter 102, indicates that one or more persons/users associated with (e.g., assigned to, logged into, etc.) the portable meter 122 are present.

The example presence detection circuitry 406 determines a presence status of audience members. In some examples, the presence detection circuitry 406 determines whether the reported data includes presence status data. That is, the presence detection circuitry 406 determines whether the device meter 102 and/or the portable meter(s) 122 generated presence status data.

If the presence detection circuitry 406 determines the reported data does not include presence status data, the presence detection circuitry 406 determines whether an audience member (e.g., the panelists 106, 107, 108) is present in the media presentation environment 104. In some examples, the presence detection circuitry 406 generates a match value. For example, the presence detection circuitry 406 determines the match value based on the comparison result(s). The example presence detection circuitry 406 determines the presence status of an audience member is "present" in response to the match value satisfying a presence threshold. In some examples, the presence detection circuitry 406 determines the presence status is "absent" in response to the match value not satisfying the threshold. In some examples, the presence threshold may be the same as the match threshold, whereas in some examples, the presence threshold may be different from (e.g., greater than or less than) the match threshold.

In some examples disclosed herein, the example presence detection circuitry 406 includes a model controller to train a model to learn about the corresponding household media environment. As used herein, a model is a description of an environment using mathematical concepts and language. A model is generally composed of relationships and variables, the relationships describing operators (e.g., such as algebraic operators, functions, etc.) and the variables describing monitored environment parameters of interest that can be quantified. In some examples, the model is a machine learning and/or artificial intelligence (AI) model such as a Linear Regression model, a decision tree, a support vector machine (SVM) model, a Naïve Bayes model, etc. In some examples, the presence detection circuitry 406 generates a feature vector corresponding to the meter data. The example presence detection circuitry 406 utilizes the feature vector to train the model. For example, the feature vector includes data representative of descriptive characteristics of a physical environment (e.g., the household media environment). In some examples, such data includes a date and time, a number and/or identification of audience members present in the media environment, a media source (e.g., radio media, television media, pay per view media, movies, Internet Protocol Television (IPTV), satellite television (TV), Internet radio, satellite radio, digital television), a media channel (e.g., broadcast channel, a domain name), and the demographics of the audience members. In this manner, the example presence detection circuitry 406 can generate the model to learn who will be in the audience and at what time. Eventually, when training is complete, the model can be deployed at the central facility 114 and utilized to make informed decisions about the audience composition.

In some examples, the central facility 114 does not include the comparator 404 and/or the presence detection circuitry 406. In some such examples, the central facility 114 does not determine presence statuses of audience members. For example, the device meter 102 and/or the portable meter(s) 122 determine a presence status of an audience member and transmit the presence status to the central facility 114.

In some examples, the device meter 102 includes means for generating device meter data. For example, the means for generating device meter data may be implemented by the media identification circuitry 202. In some examples, the media identification circuitry 202 may be implemented by machine executable instructions such as that implemented by at least blocks 602, 604 of FIG. 6, 802, 804 of FIG. 8, 902, 904 of FIG. 9 executed by processor circuitry, which may be implemented by the example processor circuitry 1212 of FIG. 12, the example processor circuitry 1500 of FIG. 15, and/or the example Field Programmable Gate Array (FPGA) circuitry 1600 of FIG. 16. In other examples, the media identification circuitry 202 is implemented by other hardware logic circuitry, hardware implemented state machines, and/or any other combination of hardware, software, and/or firmware. For example, the media identification circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the device meter 102 includes means for comparing meter data. For example, the means for comparing meter data may be implemented by the comparator 208. In some examples, the comparator 208 may be implemented by machine executable instructions such as that implemented by at least blocks 612 of FIG. 6, 1102 of FIG. 11 executed by processor circuitry, which may be implemented by the example processor circuitry 1212 of FIG. 12, the example processor circuitry 1500 of FIG. 15, and/or the example Field Programmable Gate Array (FPGA) circuitry 1600 of FIG. 16. In other examples, the comparator 208 is implemented by other hardware logic circuitry, hardware implemented state machines, and/or any other combination of hardware, software, and/or firmware. For example, the comparator 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the device meter 102 includes means for generating presence status data. For example, the means for generating presence status data may be implemented by the presence detection circuitry 210. In some examples, the presence detection circuitry 210 may be implemented by machine executable instructions such as that implemented by at least blocks 612 of FIG. 6, 1106, 1108, 1110 of FIG. 11 executed by processor circuitry, which may be implemented by the example processor circuitry 1212 of FIG. 12, the example processor circuitry 1500 of FIG. 15, and/or the example Field Programmable Gate Array (FPGA) circuitry 1600 of FIG. 16. In other examples, the presence detection circuitry 210 is implemented by other hardware logic circuitry, hardware implemented state machines, and/or any other combination of hardware, software, and/or firmware. For example, the presence detection circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the device meter 102 includes means for transmitting data. For example, the means for transmitting data may be implemented by the network communication circuitry 214. In some examples, the network communication circuitry 214 may be implemented by machine executable instructions such as that implemented by at least blocks 606, 608, 610, 614 of FIG. 6, 806, 808, 810 of FIG. 8, 906, 908, 910, 912 of FIG. 9 executed by processor circuitry, which may be implemented by the example processor circuitry 1212 of FIG. 12, the example processor circuitry 1500 of FIG. 15, and/or the example Field Programmable Gate Array (FPGA) circuitry 1600 of FIG. 16. In other examples, the network communication circuitry 214 is implemented by other hardware logic circuitry, hardware implemented state machines, and/or any other combination of hardware, software, and/or firmware. For example, the network communication circuitry 214 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the portable meter 122 includes means for recording audio data. For example, the means for recording audio data may be implemented by the audio sensor 302. In some examples, the audio sensor 302 may be implemented by machine executable instructions such as that implemented by at least blocks 502 of FIG. 5, 702 of FIG. 7 executed by processor circuitry, which may be implemented by the example processor circuitry 1312 of FIG. 13, the example processor circuitry 1500 of FIG. 15, and/or the example Field Programmable Gate Array (FPGA) circuitry 1600 of FIG. 16. In other examples, the audio sensor 302 is implemented by other hardware logic circuitry, hardware implemented state machines, and/or any other combination of hardware, software, and/or firmware. For example, the audio sensor 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the portable meter 122 includes means for generating portable meter data. For example, the means for generating portable meter data may be implemented by the media identification circuitry 304. In some examples, the media identification circuitry 304 may be implemented by machine executable instructions such as that implemented by at least blocks 504 of FIG. 5, 704 of FIG. 7 executed by processor circuitry, which may be implemented by the example processor circuitry 1312 of FIG. 13, the example processor circuitry 1500 of FIG. 15, and/or the example Field Programmable Gate Array (FPGA) circuitry 1600 of FIG. 16. In other examples, the media identification circuitry 304 is implemented by other hardware logic circuitry, hardware implemented state machines, and/or any other combination of hardware, software, and/or firmware. For example, the media identification circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the portable meter 122 includes means for comparing meter data. For example, the means for comparing meter data may be implemented by the comparator 306. In some examples, the comparator 306 may be implemented by machine executable instructions such as that implemented by at least blocks 708 of FIG. 7, 1102 of FIG. 11 executed by processor circuitry, which may be implemented by the example processor circuitry 1312 of FIG. 13, the example processor circuitry 1500 of FIG. 15, and/or the example Field Programmable Gate Array (FPGA) circuitry 1600 of FIG. 16. In other examples, the comparator 306 is implemented by other hardware logic circuitry, hardware implemented state machines, and/or any other combination of hardware, software, and/or firmware. For example, the comparator 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the portable meter 122 includes means for generating presence status data. For example, the means for generating presence status data may be implemented by the presence detection circuitry 308. In some examples, the presence detection circuitry 308 may be implemented by machine executable instructions such as that implemented by at least blocks 708 of FIG. 7, 1104, 1106, 1108, 1110 of FIG. 11 executed by processor circuitry, which may be implemented by the example processor circuitry 1312 of FIG. 13, the example processor circuitry 1500 of FIG. 15, and/or the example Field Programmable Gate Array (FPGA) circuitry 1600 of FIG. 16. In other examples, the presence detection circuitry 308 is implemented by other hardware logic circuitry, hardware implemented state machines, and/or any other combination of hardware, software, and/or firmware. For example, the presence detection circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the portable meter 122 includes means for transmitting data. For example, the means for transmitting data may be implemented by the network communication circuitry 310. In some examples, the network communication circuitry 310 may be implemented by machine executable instructions such as that implemented by at least blocks 506 of FIG. 5, 706, 710 of FIG. 7 executed by processor circuitry, which may be implemented by the example processor circuitry 1312 of FIG. 13, the example processor circuitry 1500 of FIG. 15, and/or the example Field Programmable Gate Array (FPGA) circuitry 1600 of FIG. 16. In other examples, the network communication circuitry 310 is implemented by other hardware logic circuitry, hardware implemented state machines, and/or any other combination of hardware, software, and/or firmware. For example, the network communication circuitry 310 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the central facility 114 includes means for transmitting data. For example, the means for transmitting data may be implemented by the network communication circuitry 402. In some examples, the network communication circuitry 402 may be implemented by machine executable instructions such as that implemented by at least block 1002 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the network communication circuitry 402 is implemented by other hardware logic circuitry, hardware implemented state machines, and/or any other combination of hardware, software, and/or firmware. For example, the network communication circuitry 402 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the central facility 114 includes means for comparing meter data. For example, the means for comparing meter data may be implemented by the comparator 404. In some examples, the comparator 404 may be implemented by machine executable instructions such as that implemented by at least blocks 1008 of FIG. 10, 1102 of FIG. 11 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the comparator 404 is implemented by other hardware logic circuitry, hardware implemented state machines, and/or any other combination of hardware, software, and/or firmware. For example, the comparator 404 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the central facility 114 includes means for generating presence status data. For example, the means for generating presence status data may be implemented by the presence detection circuitry 406. In some examples, the presence detection circuitry 406 may be implemented by machine executable instructions such as that implemented by at least blocks 1004, 1006, 1008 of FIG. 10, 1102, 1104, 1106, 1108, 1110 of FIG. 11 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the presence detection circuitry 406 is implemented by other hardware logic circuitry, hardware implemented state machines, and/or any other combination of hardware, software, and/or firmware. For example, the presence detection circuitry 406 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the device meter 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example media identification circuitry 202, the example media measurement data controller 204, the example data store 206, the example comparator 208, the example presence detection circuitry 210, the example communication processor 212, the network communication circuitry 214, and/or, more generally, the example device meter 102 of FIG. 2, may be implemented by hardware, software, firmware, and/or any combination of hardware, software, and/or firmware. Thus, for example, any of the example media identification circuitry 202, the example media measurement data controller 204, the example data store 206, the example comparator 208, the example presence detection circuitry 210, the example communication processor 212, the network communication circuitry 214, and/or, more generally, the example device meter 102, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example media identification circuitry 202, the example media measurement data controller 204, the example data store 206, the example comparator 208, the example presence detection circuitry 210, the example communication processor 212, and/or the network communication circuitry 214 is/are hereby expressly defined to include a non-transitory computer readable storage device or storage disk such as a memory, a digital versatile disk (DVD), a compact disk (CD), a Blu-ray disk, etc., including the software and/or firmware. Further still, the example device meter 102 of FIG. 1 may include one or more elements, processes, and/or devices in addition to, or instead of, those illustrated in FIG. 2, and/or may include more than one of any or all of the illustrated elements, processes and devices.

While an example manner of implementing the portable meter 122 of FIG. 1 is illustrated in FIG. 3, one or more of the elements, processes, and/or devices illustrated in FIG. 3 may be combined, divided, re-arranged, omitted, eliminated, and/or implemented in any other way. Further, the example audio sensor 302, media identification circuitry 304, the example comparator 306, the example presence detection circuitry 308, the network communication circuitry 310, and/or, more generally, the example portable meter 122 of FIG. 3, may be implemented by hardware, software, firmware, and/or any combination of hardware, software, and/or firmware. Thus, for example, any of the example audio sensor 302, media identification circuitry 304, the example comparator 306, the example presence detection circuitry 308, the network communication circuitry 310, and/or, more generally, the example portable meter 122, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example audio sensor 302, media identification circuitry 304, the example comparator 306, the example presence detection circuitry 308, and/or the network communication circuitry 310 is/are hereby expressly defined to include a non-transitory computer readable storage device or storage disk such as a memory, a digital versatile disk (DVD), a compact disk (CD), a Blu-ray disk, etc., including the software and/or firmware. Further still, the example portable meter 122 of FIG. 1 may include one or more elements, processes, and/or devices in addition to, or instead of, those illustrated in FIG. 3, and/or may include more than one of any or all of the illustrated elements, processes and devices.

While an example manner of implementing the central facility 114 of FIG. 1 is illustrated in FIG. 4, one or more of the elements, processes, and/or devices illustrated in FIG. 4 may be combined, divided, re-arranged, omitted, eliminated, and/or implemented in any other way. Further, the example the network communication circuitry 402, the example comparator 404, the example presence detection circuitry 406, the example data store 408, and/or, more generally, the example central facility 114 of FIG. 4, may be implemented by hardware, software, firmware, and/or any combination of hardware, software, and/or firmware. Thus, for example, any of the example the network communication circuitry 402, the example comparator 404, the example presence detection circuitry 406, the example data store 408, and/or, more generally, the example central facility 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example the network communication circuitry 402, the example comparator 404, the example presence detection circuitry 406, and/or the example data store 408 is/are hereby expressly defined to include a non-transitory computer readable storage device or storage disk such as a memory, a digital versatile disk (DVD), a compact disk (CD), a Blu-ray disk, etc., including the software and/or firmware. Further still, the example portable meter 122 of FIG. 1 may include one or more elements, processes, and/or devices in addition to, or instead of, those illustrated in FIG. 3, and/or may include more than one of any or all of the illustrated elements, processes and devices.

Figure 6:
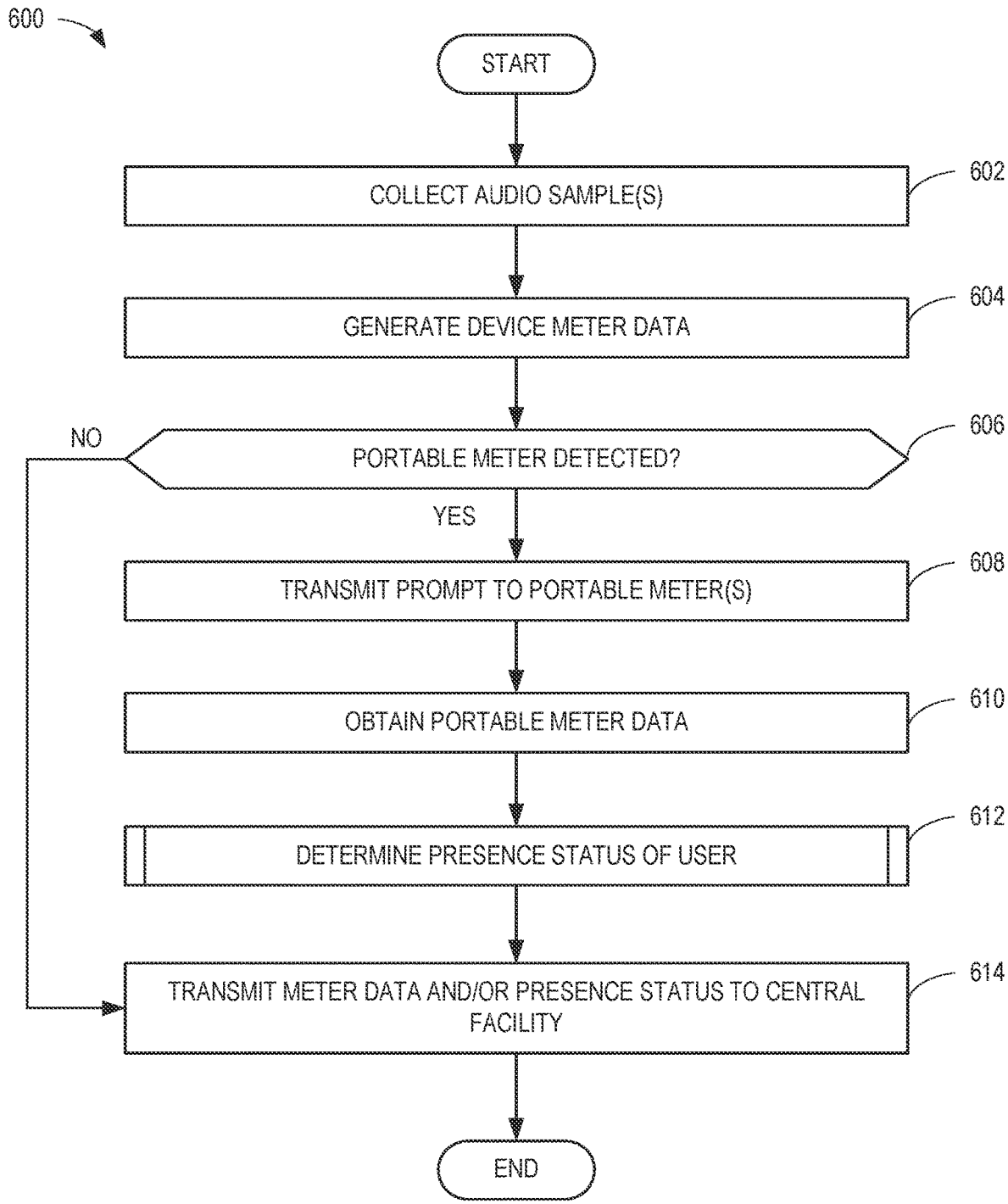
FIG. 6 is a flowchart representative of example machine readable instructions that may be executed by example processor circuitry to implement the example device meter of FIGS. 1 and/or 2 to generate presence status data.
Figure 8:
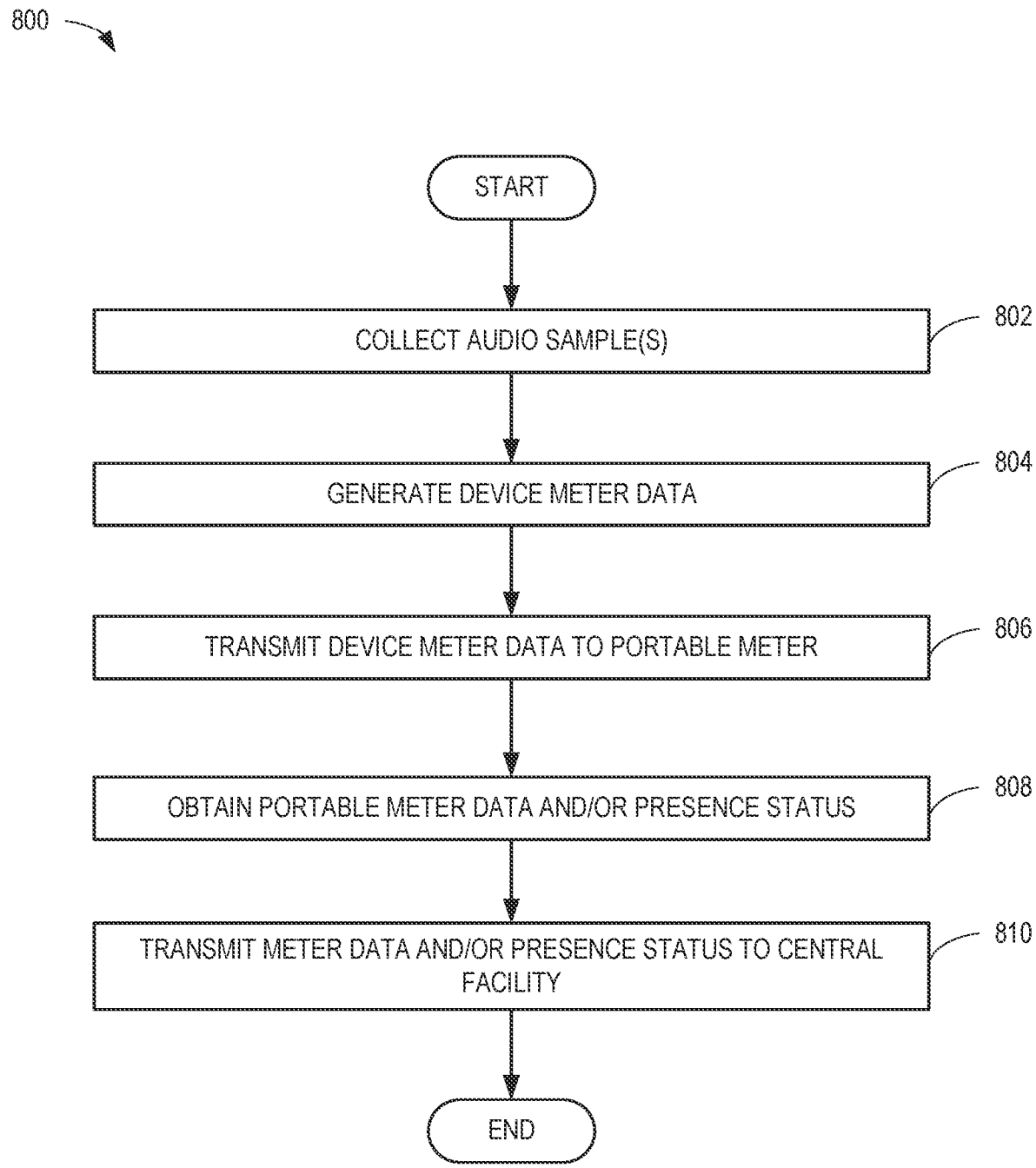
FIG. 8 is a flowchart representative of example machine readable instructions that may be executed by example processor circuitry to implement the example device meter of FIGS. 1 and/or 2 to generate device meter data.
Figure 9:
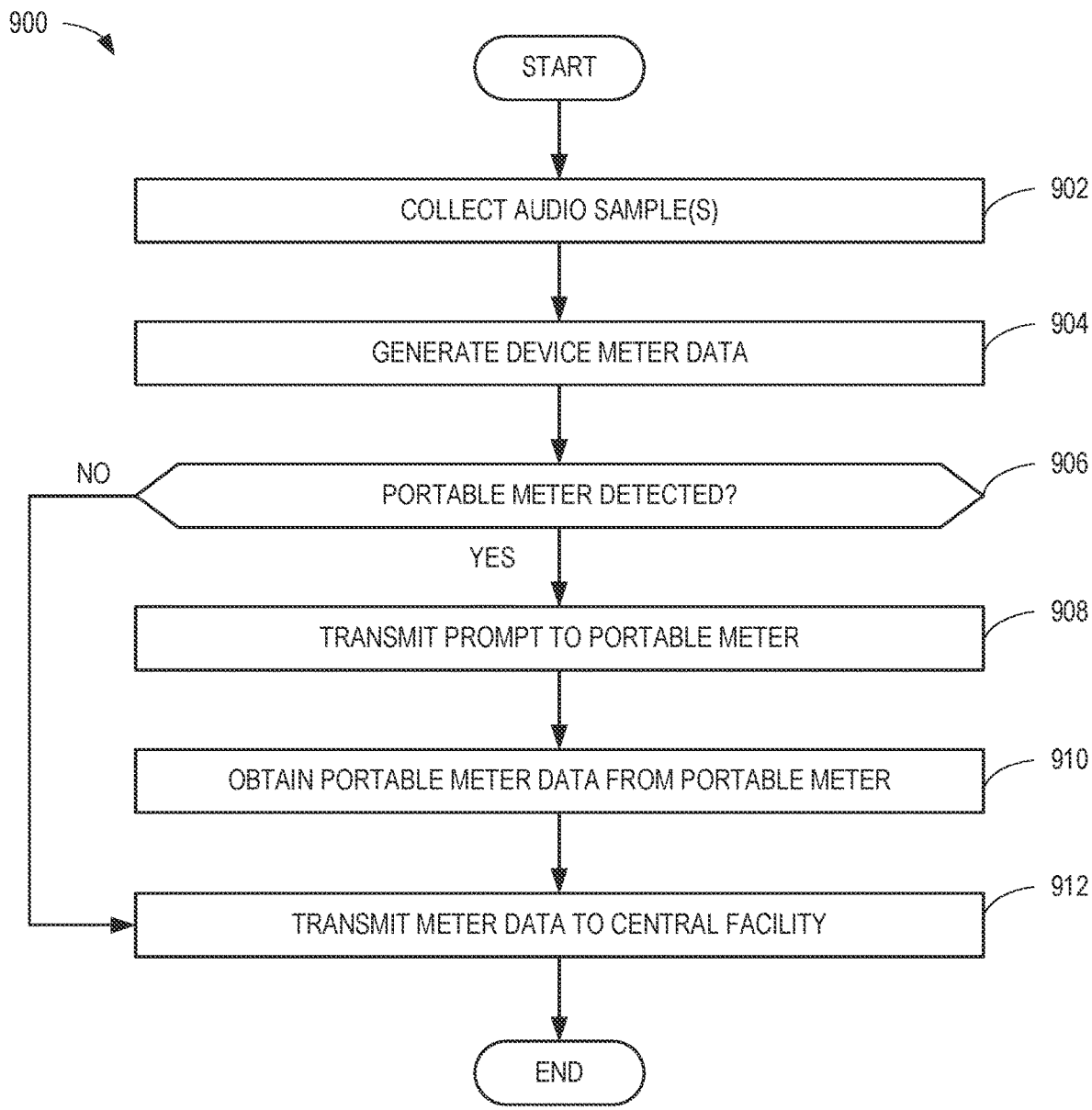
FIG. 9 is a flowchart representative of example machine readable instructions that may be executed by example processor circuitry to implement the example device meter of FIGS. 1 and/or 2 to generate device meter data.

Flowcharts representative of example hardware logic circuitry, machine readable instructions, hardware implemented state machines, and/or any combination thereof for implementing the device meter 102 of FIGS. 1 and/or 2 are shown in FIGS. 6, 8, 9, and/or 11. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 15 and/or 16. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6, 8, 9, and/or 11, many other methods of implementing the example device meter 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 5:
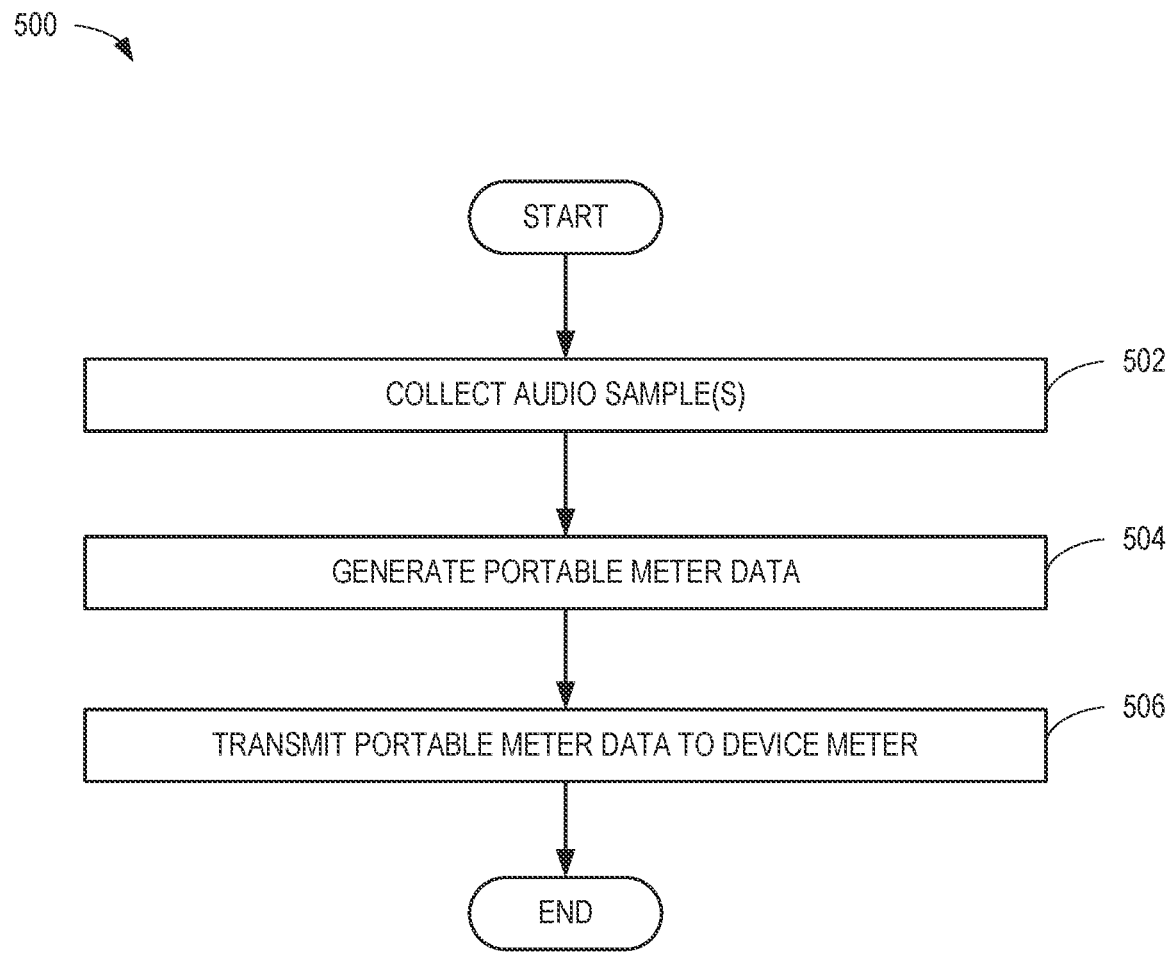
FIG. 5 is a flowchart representative of example machine readable instructions that may be executed by example processor circuitry to implement the example portable meter of FIGS. 1 and/or 3 to generate portable meter data.
Figure 7:
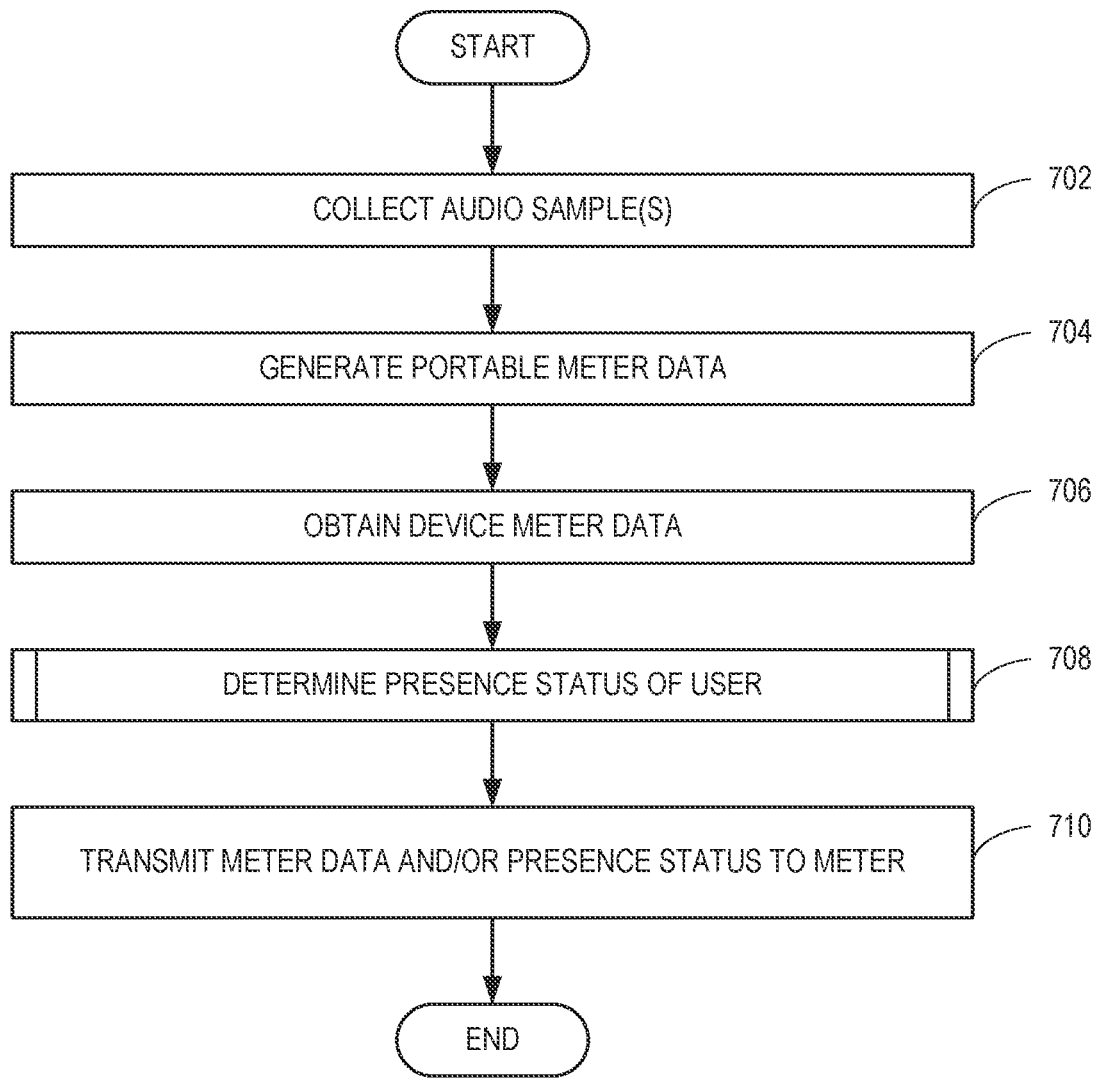
FIG. 7 is a flowchart representative of example machine readable instructions that may be executed by example processor circuitry to implement the example portable meter of FIGS. 1 and/or 3 to generate presence status data.

Flowcharts representative of example hardware logic circuitry, machine readable instructions, hardware implemented state machines, and/or any combination thereof for implementing the portable meter 122 of FIGS. 1 and/or 3 are shown in FIGS. 5, 7, and/or 11. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 15 and/or 16. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5, 7, and/or 11, many other methods of implementing the example portable meter 122 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

Figure 10:
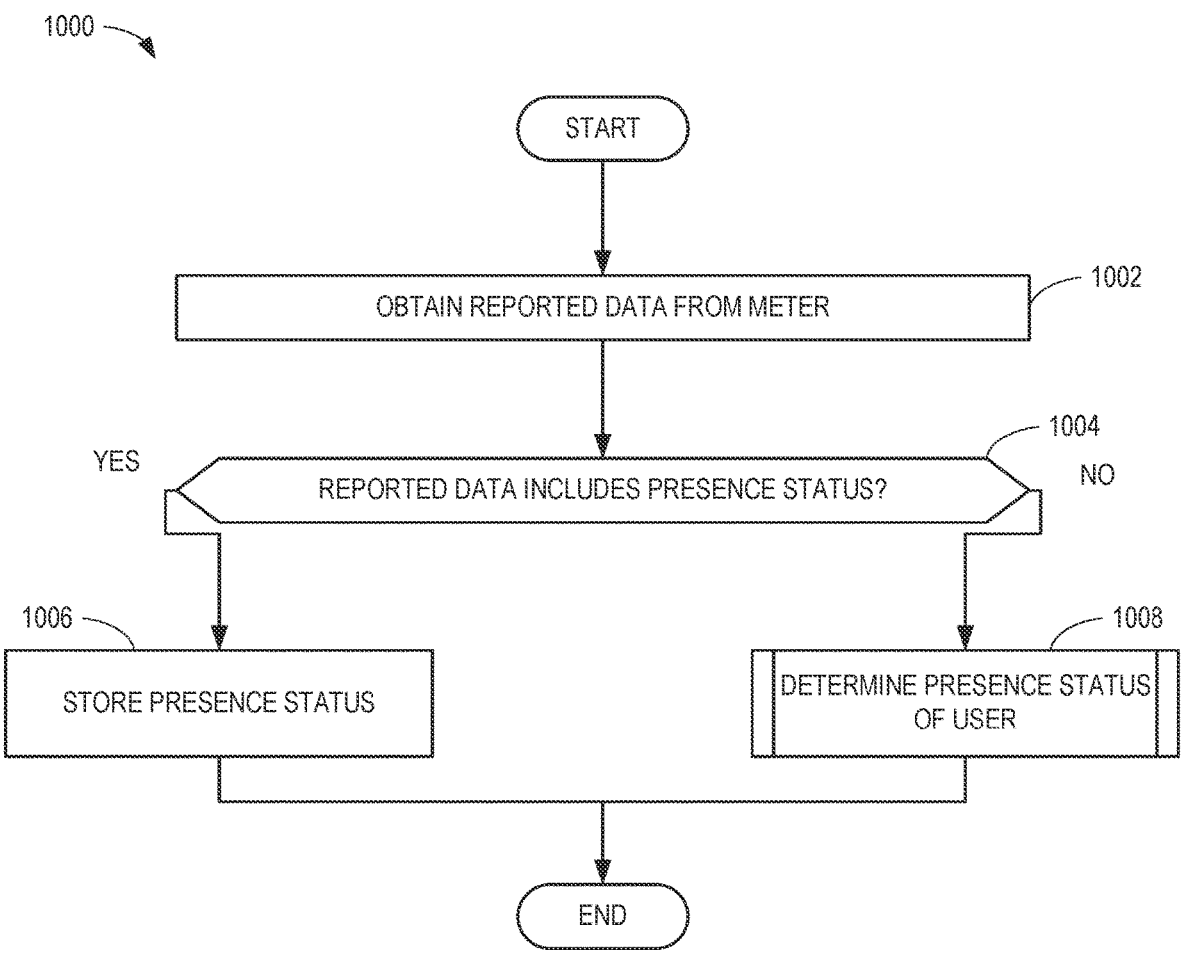
FIG. 10 is a flowchart representative of example machine readable instructions that may be executed by example processor circuitry to implement the example central facility of FIGS. 1 and/or 4 to generate presence status data.

Flowcharts representative of example hardware logic circuitry, machine readable instructions, hardware implemented state machines, and/or any combination thereof for implementing the central facility 114 of FIGS. 1 and/or 4 are shown in FIGS. 10 and/or 11. The machine readable instructions may be one or more executable programs or portion(s) of an executable program for execution by processor circuitry, such as the processor circuitry 1412 shown in the example processor platform 1400 discussed below in connection with FIG. 14 and/or the example processor circuitry discussed below in connection with FIGS. 15 and/or 16. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 10 and/or 11, many other methods of implementing the example central facility 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 5-11 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of first example machine readable instructions and/or example operations 500 that may be executed and/or instantiated by processor circuitry to implement the example portable meter 122. The machine readable instructions and/or operations 500 of FIG. 5 begin at block 502, at which the example audio sensor 302 collects audio sample(s). For example, the audio sensor 302 records audio samples of the media presentation environment 104. At block 504, the example media identification circuitry 304 generates portable meter data. For example, the media identification circuitry 304 generates signatures based on the audio sample(s). Additionally or alternatively, the media identification circuitry 304 detects watermarks in the audio sample(s). At block 506, the example network communication circuitry 310 transmits the portable meter data to the device meter 102.

FIG. 6 is a flowchart representative of first example machine readable instructions and/or example operations 600 that may be executed and/or instantiated by processor circuitry to implement the example device meter 102. The machine readable instructions and/or operations 600 of FIG. 6 begin at block 602, at which the example audio sensor 120 collects audio sample(s). At block 604, the example media identification circuitry 202 generates device meter data. For example, the media identification circuitry 202 generates signatures based on the audio sample(s). Additionally or alternatively, the media identification circuitry 202 detects watermarks in the audio sample(s).

At block 606, the example network communication circuitry 214 determines whether a portable meter is detected. For example, the network communication circuitry 214 determines whether the portable meter 122 is powered on, within a threshold distance of the device meter 102, etc. If, at block 606, the example network communication circuitry 214 determines the portable meter 122 is not detected, the instructions 600 proceed to block 614. If, at block 606, the example network communication circuitry 214 determines the portable meter 122 is detected, at block 608, the example network communication circuitry 214 transmits a prompt to the portable meter(s) 122. For example, the network communication circuitry 214 prompts the portable meter(s) 122 to transmit the portable meter data to the device meter 102.

At block 610, the example network communication circuitry 214 obtains the portable meter data. For example, the network communication circuitry 214 obtains signatures and/or watermarks generated by the portable meter(s) 122 (e.g., at block 504 of FIG. 5). At block 612, the example presence detection circuitry 210 determines the presence status of a user. For example, the presence detection circuitry 210 determines the presence status of audience members (e.g., the panelists 106, 107, 108 of FIG. 1). In some examples, the presence detection circuitry 210 compares the portable meter data and the device meter data to generate a match score. Example instructions that may be used to implement block 612 are described in more detail below in connection with FIG. 11.

At block 614, the example network communication circuitry 214 transmits the meter data and/or the presence status to the example central facility 114. For example the meter data can include the portable meter data and/or the device meter data. Additionally or alternatively, the presence status can include whether the audience members are present or absent.

FIG. 7 is a flowchart representative of second example machine readable instructions and/or example operations 700 that may be executed and/or instantiated by processor circuitry to implement the example portable meter 122. The machine readable instructions and/or operations 700 of FIG. 7 begin at block 702, at which the example audio sensor 302 collects audio sample(s). For example, the audio sensor 302 records audio samples of the media presentation environment 104. At block 704, the example media identification circuitry 304 generates portable meter data. For example, the media identification circuitry 304 generates signatures based on the audio sample(s). Additionally or alternatively, the media identification circuitry 304 detects watermarks in the audio sample(s).

At block 706, the example network communication circuitry 310 (FIG. 3) obtains device meter data. For example, the network communication circuitry 310 obtains signatures and/or watermarks generated by the device meter 102. At block 708, the example presence detection circuitry 308 (FIG. 3) determines the presence status of a user. Example instructions that may be used to implement block 708 are described in more detail below in connection with FIG. 11.

At block 710, the example network communication circuitry 310 transmits the meter data and/or the presence status to the device meter 102. For example, the network communication circuitry 310 transmits the portable meter data to the device meter 102. Additionally or alternatively, the presence status includes whether audience members are present or absent from the media presentation environment 104.

FIG. 8 is a flowchart representative of second example machine readable instructions and/or example operations 800 that may be executed and/or instantiated by processor circuitry to implement the example device meter 102. The machine readable instructions and/or operations 800 of FIG. 8 begin at block 802, at which the example audio sensor 120 collects audio sample(s). At block 804, the example media identification circuitry 202 generates device meter data. For example, the media identification circuitry 202 generates signatures based on the audio sample(s). Additionally or alternatively, the media identification circuitry 202 detects watermarks in the audio sample(s).

At block 806, the example network communication circuitry 214 transmits the device meter data to the portable meter(s) 122. For example, the network communication circuitry 214 transmits signatures and/or codes to the portable meter(s) 122. At block 808, the example network communication circuitry 214 obtains the portable meter data and/or a presence status. For example, the network communication circuitry 214 obtains the portable meter data generated by the portable meter(s) 122 (e.g., at block 704 of FIG. 7). Additionally or alternatively, the network communication circuitry 214 obtains the presence status for the audience members of the media presentation environment 104. At block 810, the network communication circuitry 214 transmits the meter data and/or the presence status to the central facility 114. For example, the meter data includes the portable meter data and/or the device meter data.

FIG. 9 is a flowchart representative of third example machine readable instructions and/or example operations 900 that may be executed and/or instantiated by processor circuitry to implement the example device meter 102. The machine readable instructions and/or operations 900 of FIG. 9 begin at block 902, at which the example audio sensor 120 collects audio sample(s). At block 904, the example media identification circuitry 202 generates device meter data. For example, the media identification circuitry 202 generates signatures based on the audio sample(s). Additionally or alternatively, the media identification circuitry 202 detects watermarks in the audio sample(s).

At block 906, the example network communication circuitry 214 determines whether a portable meter is detected. For example, the network communication circuitry 214 determines whether the portable meter 122 is powered on, within a threshold distance of the device meter 102, etc. If, at block 906, the example network communication circuitry 214 determines the portable meter 122 is not detected, the instructions 900 proceed to block 912. If, at block 906, the example network communication circuitry 214 determines the portable meter 122 is detected, at block 908, the example network communication circuitry 214 transmits a prompt to the portable meter(s) 122. For example, the network communication circuitry 214 prompts the portable meter(s) 122 to transmit the portable meter data to the device meter 102.

At block 910, the example network communication circuitry 214 obtains the portable meter data. For example, the network communication circuitry 214 obtains signatures and/or watermarks generated by the portable meter(s) 122 (e.g., at block 504 of FIG. 5). At block 912, the example network communication circuitry 214 transmits the meter data and/or the presence status to the example central facility 114. For example the meter data can include the portable meter data and/or the device meter data. Additionally or alternatively, the presence status can include whether the audience members are present or absent.

FIG. 10 is a flowchart representative of example machine readable instructions and/or example operations 1000 that may be executed and/or instantiated by processor circuitry to implement the example central facility 114. The machine readable instructions and/or operations 1000 of FIG. 10 begin at block 1002, at which the example network communication circuitry 402 obtains reported data from the device meter 102. For example, the network communication circuitry 402 obtains device meter data, portable meter data, and/or presence status data.

At block 1004, the example presence detection circuitry 406 determines whether the reported data includes presence status data. If, at block 1004, the example presence detection circuitry 406 determines the reported data includes presence status data, at block 1006, the example comparator 404 stores the presence status data. For example, the presence status data is stored in the example data store 408. If, at block 1004, the example presence detection circuitry 406 determines the reported data does not include presence status data, at block 1008, the example presence detection circuitry 406 determines the presence status of a user. Example instructions that may be used to implement block 1008 are described in more detail below in connection with FIG. 11.

Figure 11:
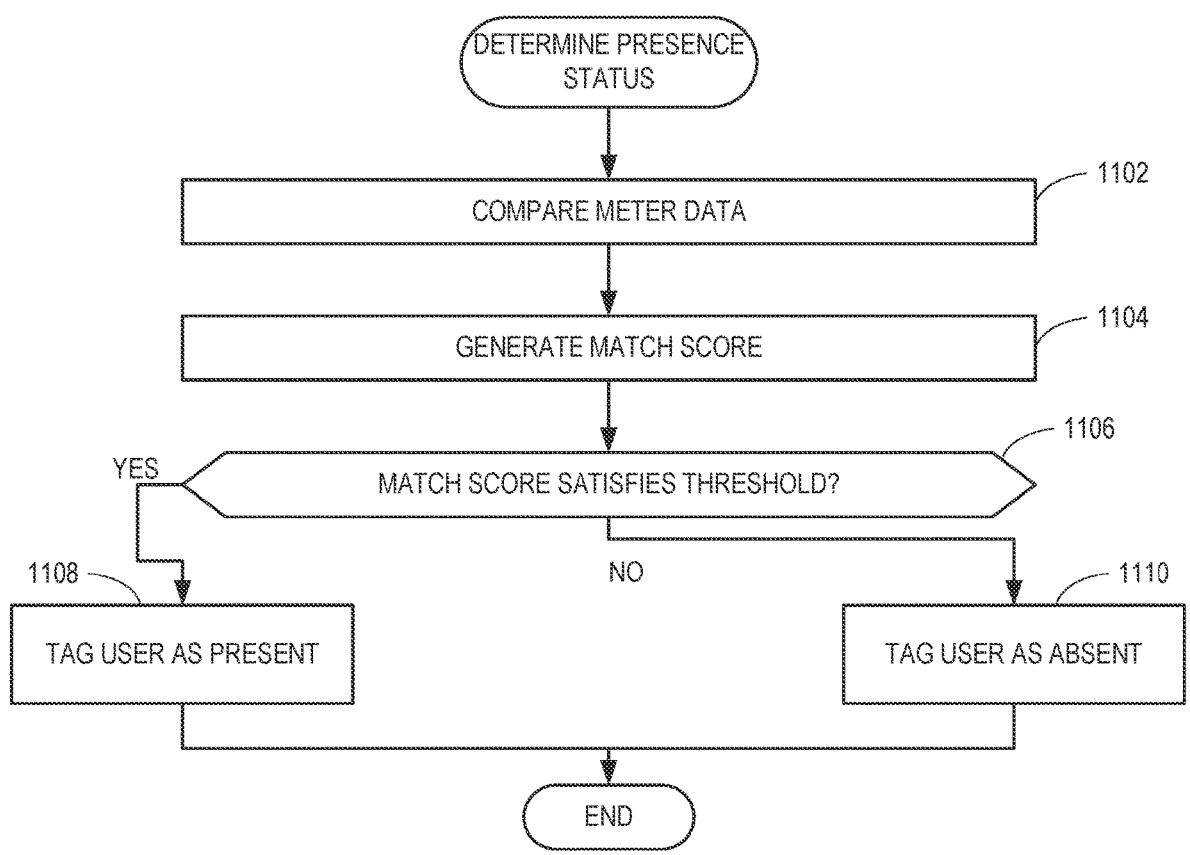
FIG. 11 is a flowchart representative of example machine readable instructions that may be executed by example processor circuitry to implement the example device meter of FIGS. 1 and/or 2, the example portable meter of FIGS. 1 and/or 3, and/or the example central facility of FIGS. 1 and/or 4 to detect a presence status.

FIG. 11 is a flowchart representative of example machine readable instructions and/or example operations 612, 708, and/or 1008 that may be executed and/or instantiated by processor circuitry to determine a presence status. The machine readable instructions and/or operations 612, 708, and/or 1008 of FIG. 11 begin at block 1102, at which at least one of the example comparators 208, 306, 404 compare meter data. For example, in the example instructions 600 of FIG. 6, the example comparator 208 compares the portable meter data and the device meter data. Additionally or alternatively, in the example instructions 700 of FIG. 7, the example comparator 306 compares the portable meter data and the device meter data. Additionally or alternatively, in the example instructions 1000 of FIG. 10, the example comparator 404 compares the portable meter data and the device meter data. For example, the comparators 208, 306, 404 generate a comparison result representative of a degree of similarity between the meter data.

At block 1104, at least one of the example presence detection circuitries 210, 308, 406 generate a match score. For example, in the example instructions 600 of FIG. 6, the example presence detection circuitry 210 generates the match score based on the comparison result(s) (e.g., generated at block 1102). Additionally or alternatively, in the example instructions 700 of FIG. 7, the example presence detection circuitry 308 generates the match score. Additionally or alternatively, in the example instructions 1000 of FIG. 10, the example presence detection circuitry 406 generates the match score. In some examples, the presence detection circuitries 210, 308, 406 generate the match score based on radio frequencies, etc.

At block 1106, at least one of the example presence detection circuitry 210, 308, 406 determine whether the match score satisfies a threshold. If, at block 1106, the example presence detection circuitries 210, 308, 406 determine the match score satisfies the threshold, at block 1108, the example presence detection circuitries 210, 308, 406 tag the user as present. For example, the presence detection circuitries 210, 308, 406 determine the portable meter(s) 122 are "logged in," the audience members are in the media presentation environment 104, etc. If, at block 1106, the example presence detection circuitries 210, 308, 406 determine the match score does not satisfy the threshold, at block 1110, the example presence detection circuitries 210, 308, 406 tag the user as absent. For example, the presence detection circuitries 210, 308, 406 determine the portable meter(s) 122 are "logged out," the audience members are not in the media presentation environment 104, etc.

Figure 12:
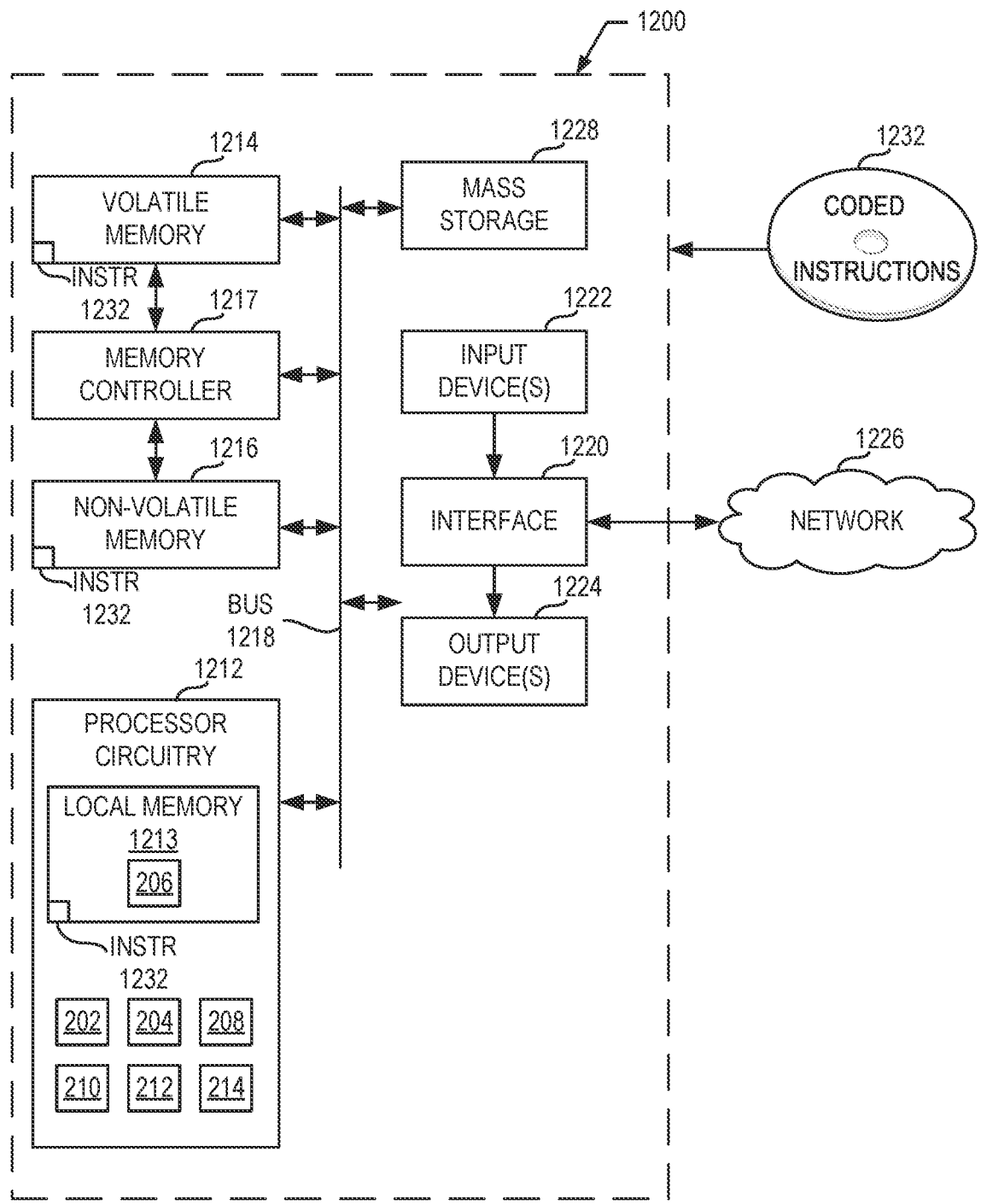
FIG. 12 is a block diagram of an example processing platform including processor circuitry structured to execute the example machine readable instructions of FIGS. 6, 8, 9, and/or 11 to implement the example device meter of FIGS. 1 and/or 2.

FIG. 12 is a block diagram of an example processor platform 1200 structured to execute and/or instantiate the example machine readable instructions and/or operations of FIGS. 6, 8, 9, and/or 11 to implement the example device meter 102 of FIGS. 1 and/or 2. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the example media identification circuitry 202, the example media measurement data controller 204, the example comparator 208, the example presence detection circuitry 210, the example communication processor 212, the network communication circuitry 214.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1232, which may be implemented by the machine readable instructions of FIGS. 6, 8, 9, and/or 11, may be stored in the mass storage device 1228, in the volatile memory 1214, in the non-volatile memory 1216, and/or on a removable non-transitory computer readable storage medium such as a CD or DVD.

Figure 13:
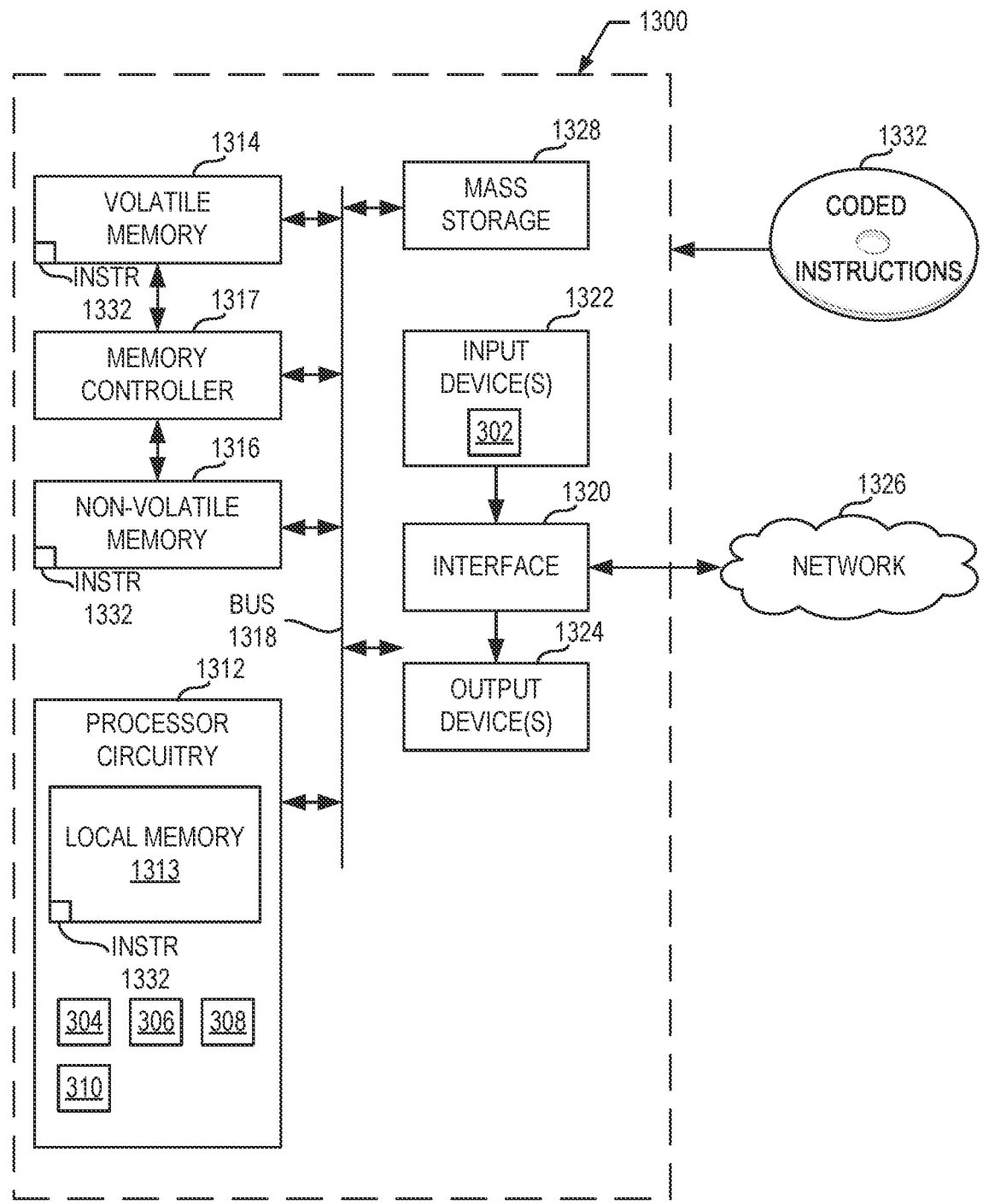
FIG. 13 is a block diagram of an example processing platform including processor circuitry structured to execute the example machine readable instructions of FIGS. 5, 7, and/or 11 to implement the example portable meter of FIGS. 1 and/or 3.

FIG. 13 is a block diagram of an example processor platform 1300 structured to execute and/or instantiate the example machine readable instructions and/or operations of FIGS. 5, 7, and/or 11 to implement the example portable meter 122 of FIGS. 1 and/or 3. The processor platform 1300 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example media identification circuitry 304, the example comparator 306, the example presence detection circuitry 308, and the network communication circuitry 310.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1332, which may be implemented by the machine readable instructions of FIGS. 5, 7, and/or 11, may be stored in the mass storage device 1328, in the volatile memory 1314, in the non-volatile memory 1316, and/or on a removable non-transitory computer readable storage medium such as a CD or DVD.

Figure 14:
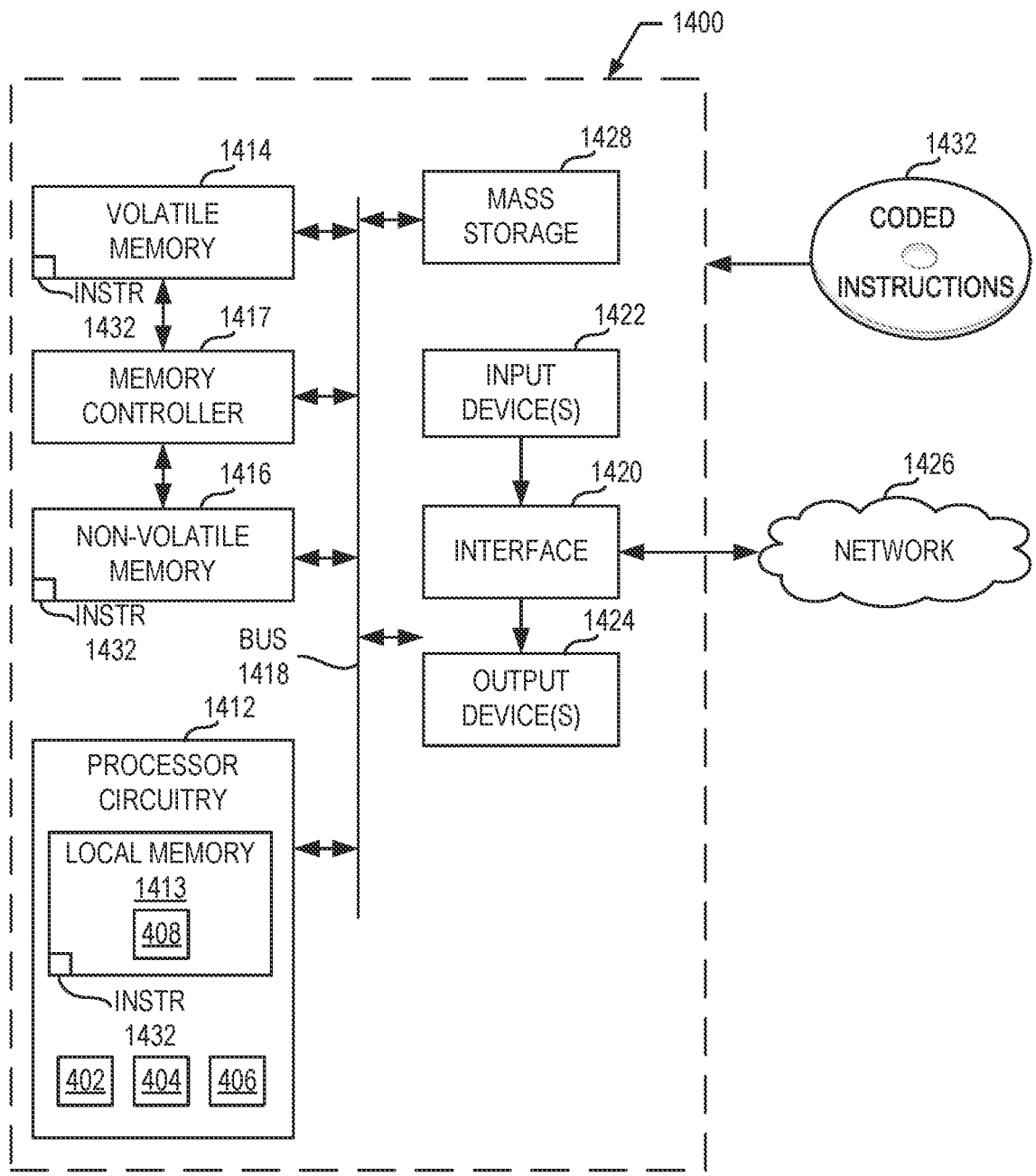
FIG. 14 is a block diagram of an example processing platform including processor circuitry structured to execute the example machine readable instructions of FIGS. 10 and/or 11 to implement the example central facility of FIGS. 1 and/or 4.

FIG. 14 is a block diagram of an example processor platform 1400 structured to execute and/or instantiate the example machine readable instructions and/or operations of FIGS. 10 and/or 11 to implement the example central facility 114 of FIGS. 1 and/or 4. The processor platform 1400 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the network communication circuitry 402, the example comparator 404, and the example presence detection circuitry 406.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1432, which may be implemented by the machine readable instructions of FIGS. 10 and/or 11, may be stored in the mass storage device 1428, in the volatile memory 1414, in the non-volatile memory 1416, and/or on a removable non-transitory computer readable storage medium such as a CD or DVD.

Figure 15:
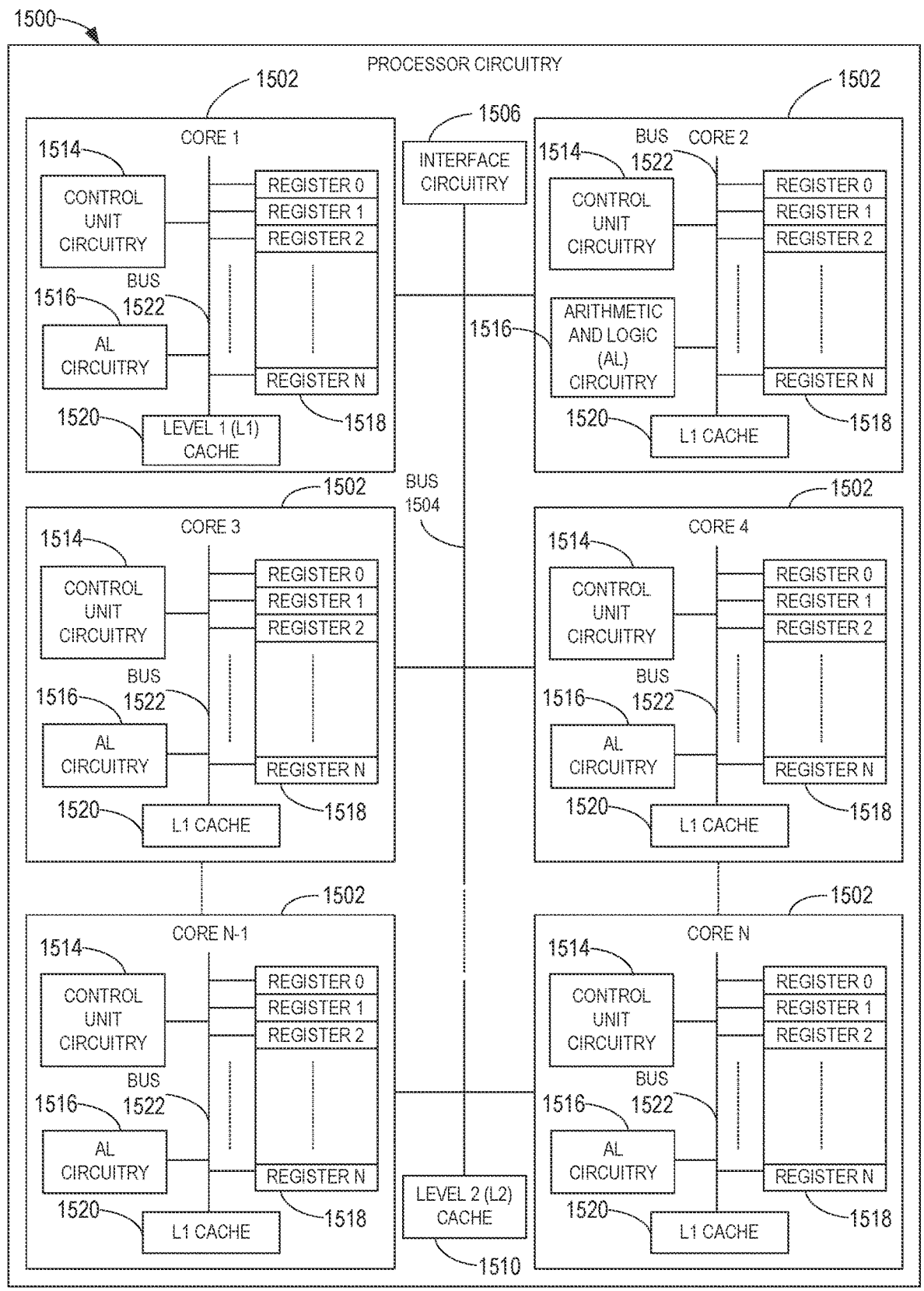
FIG. 15 is a block diagram of an example implementation of the processor circuitry of FIGS. 12-14.

FIG. 15 is a block diagram of an example implementation of the processor circuitries 1212 of FIG. 12, 1312 of FIG. 13, and/or 1412 of FIG. 14. In this example, the processor circuitries 1212 of FIG. 12, 1312 of FIG. 13, and/or 1412 of FIG. 14 are implemented by a microprocessor 1500. For example, the microprocessor 1500 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowcharts of FIGS.

The cores 1502 may communicate by an example bus 1504. In some examples, the bus 1504 may implement a communication bus to effectuate communication associated with one(s) of the cores 1502. For example, the bus 1504 may implement at least one of an Inter-Integrated Circuit (I2C) bus, a Serial Peripheral Interface (SPI) bus, a PCI bus, or a PCIe bus. Additionally or alternatively, the bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2_ cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1214, 1216 of FIG. 12, 1314, 1316 of FIG. 13, 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and an example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The bus 1522 may implement at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
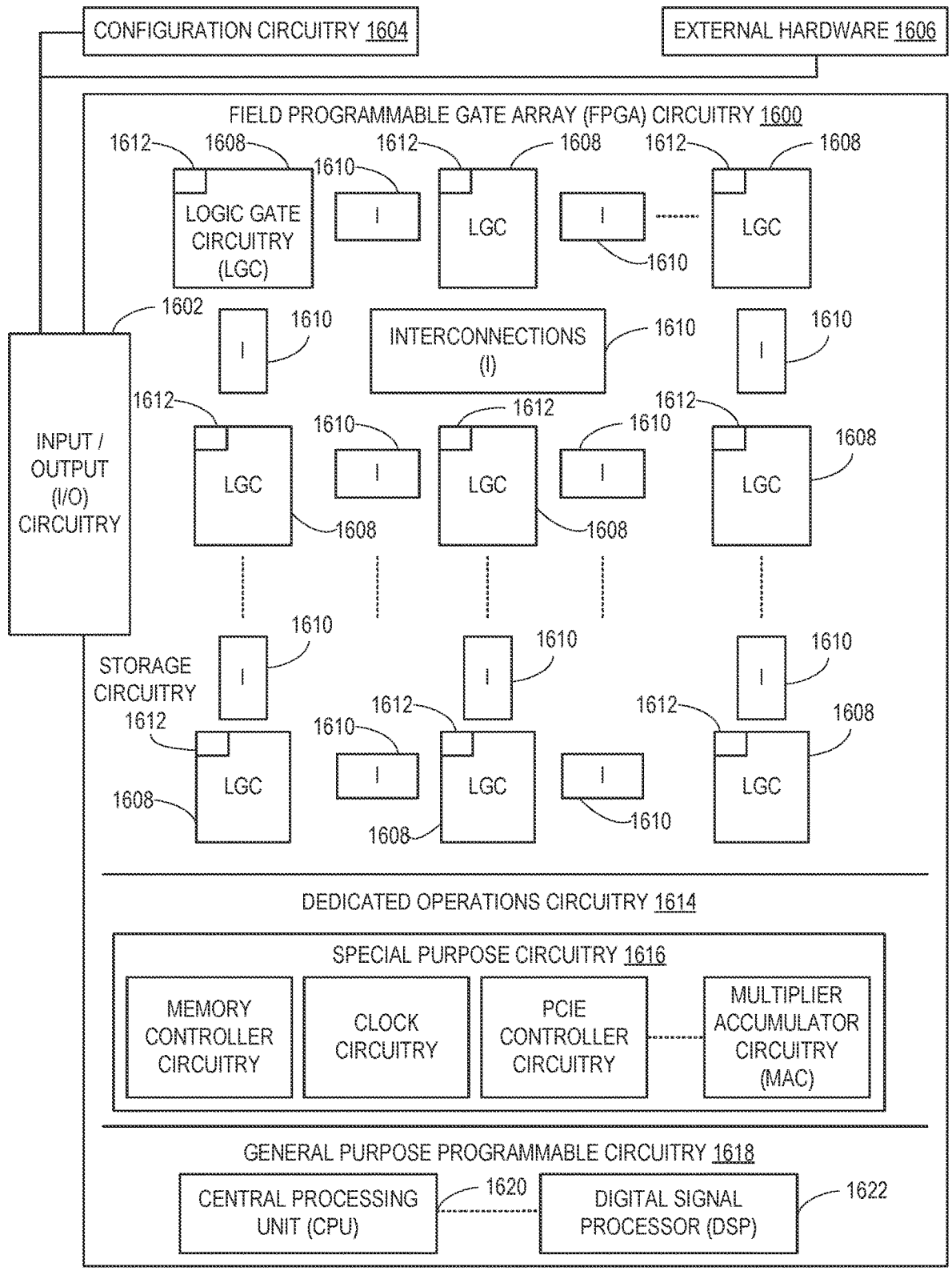
FIG. 16 is a block diagram of another example implementation of the processor circuitry of FIGS. 12-14.

FIG. 16 is a block diagram of another example implementation of the processor circuitries 1212 of FIG. 12, 1312 of FIG. 13, and/or 1412 of FIG. 14. In this example, the processor circuitries 1212, 1312, and/or 1412 are implemented by FPGA circuitry 1600. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 5 described above (which is a general purpose device that may be programmed to execute some or all of the machine readable instructions represented by the flowcharts of FIGS. 5-11 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowcharts of FIGS. 5-11. In particular, the FPGA 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowcharts of FIGS. 5-11. As such, the FPGA circuitry 1600 may be structured to effectively instantiate some or all of the machine readable instructions of the flowcharts of FIGS. 5-11 as dedicated logic circuits to perform the operations corresponding to those software instructions in a dedicated manner analogous to an ASIC. Therefore, the FPGA circuitry 1600 may perform the operations corresponding to the some or all of the machine readable instructions of FIGS. 5-11 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1600 of FIG. 5. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIGS. 5-11 and/or other desired operations. The logic gate circuitry 1608 shown in FIG. 16 is fabricated in groups or blocks.

Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitries 1212 of FIG. 12, 1312 of FIG. 13, and/or 1412 of FIG. 14, many other approaches are contemplated. For example, as mentioned above, modern FPGA circuitry may include an on-board CPU, such as one or more of the example CPU 1620 of FIG. 16. Therefore, the processor circuitries 1212 of FIG. 12, 1312 of FIG. 13, and/or 1412 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowcharts of FIGS. 5-11 may be executed by one or more of the cores 1502 of FIG. 15 and a second portion of the machine readable instructions represented by the flowcharts of FIGS. 5-11 may be executed by the FPGA circuitry 1600 of FIG. 16.

In some examples, the processor circuitries 1212 of FIG. 12, 1312 of FIG. 13, and/or 1412 of FIG. 14 may be in one or more packages. For example, the processor circuitry 1500 of FIG. 15 and/or the FPGA circuitry 1600 of FIG. 16 may be in one or more packages. In some examples, an XPU may be implemented by the processor circuitries 1212 of FIG. 12, 1312 of FIG. 13, and/or 1412 of FIG. 14, which may be in one or more packages. For example, the XPU may include a CPU in one package, a DSP in another package, a GPU in yet another package, and an FPGA in still yet another package.

Figure 17:
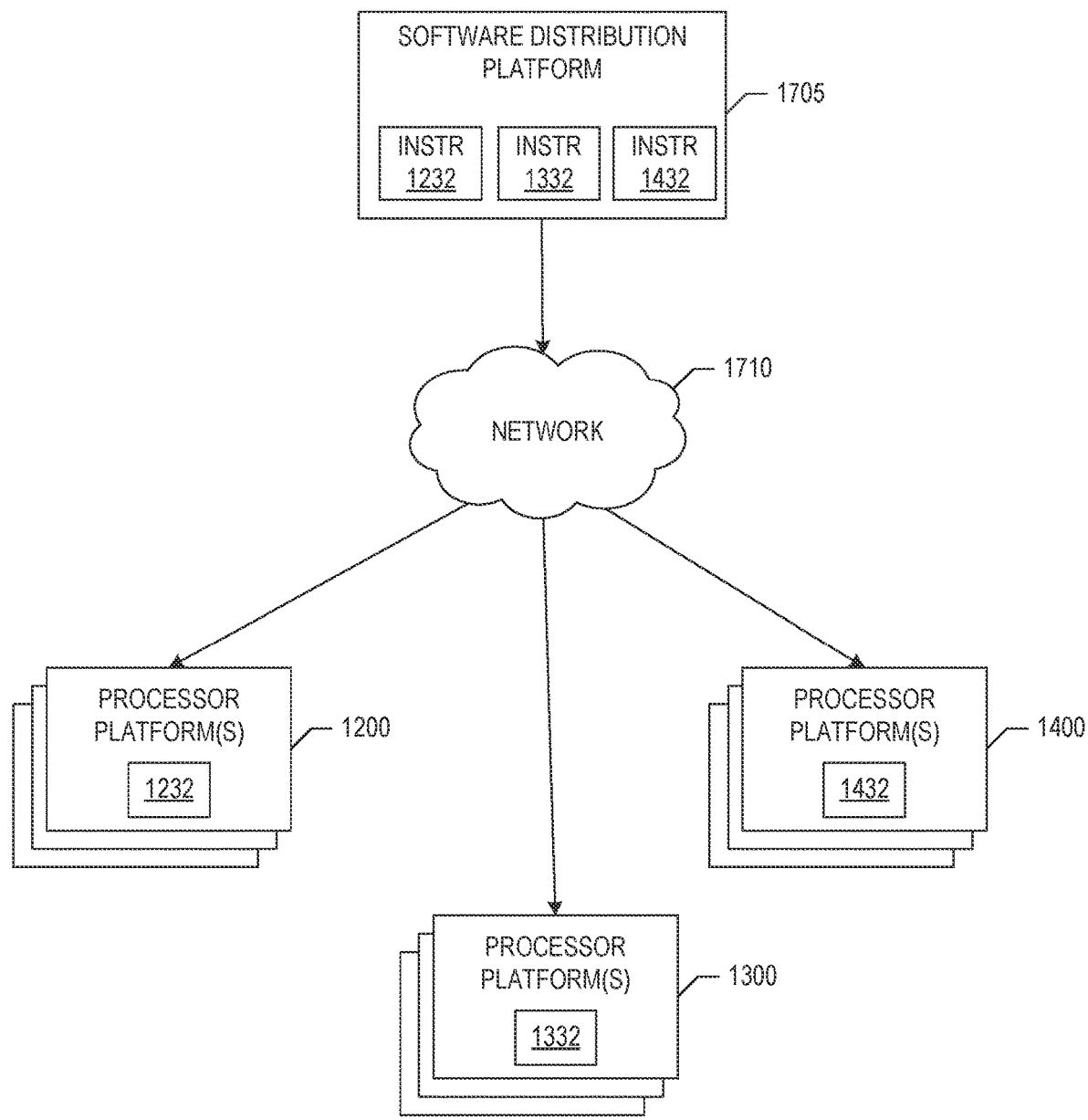
FIG. 17 is a block diagram of an example software distribution platform (e.g., one or more servers) to distribute software (e.g., software corresponding to the example machine readable instructions of FIGS. 5-11) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1705 to distribute software such as the example machine readable instructions 1232 of FIG. 12, 1332 of FIG. 13, and/or 1432 of FIG. 14 to hardware devices owned and/or operated by third parties is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform 1705. For example, the entity that owns and/or operates the software distribution platform 1705 may be a developer, a seller, and/or a licensor of software such as the example machine readable instructions 1232 of FIG. 12, 1332 of FIG. 13, and/or 1432 of FIG. 14. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the machine readable instructions 1232, 1332, 1432, which may correspond to the example machine readable instructions of FIGS. 5-11, as described above. The one or more servers of the example software distribution platform 1705 are in communication with a network 1710, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232, 1332, 1432 from the software distribution platform 1705. For example, the software, which may correspond to the example machine readable instructions of FIGS. 6, 8, 9, and/or 11, may be downloaded to the example processor platforms 1200, which is to execute the machine readable instructions 1232 to implement the example device meter 102. For example, the software, which may correspond to the example machine readable instructions of FIGS. 5, 7, and/or 11, may be downloaded to the example processor platforms 1300, which is to execute the machine readable instructions 1332 to implement the example portable meter 122. For example, the software, which may correspond to the example machine readable instructions of FIGS. 10 and/or 11, may be downloaded to the example processor platforms 1400, which is to execute the machine readable instructions 1432 to implement the example central facility 114. In some example, one or more servers of the software distribution platform 1705 periodically offer, transmit, and/or force updates to the software (e.g., the example machine readable instructions 1232 of FIG. 12, 1332 of FIG. 13, and/or 1432 of FIG. 14) to ensure improvements, patches, updates, etc., are distributed and applied to the software at the end user devices.

From the foregoing, it will be appreciated that example systems, methods, apparatus, and articles of manufacture have been disclosed that detect a presence status of audience members. The disclosed systems, methods, apparatus, and articles of manufacture improve the efficiency of using a computing device by comparing meter data to passively detect a presence status of audience members in a media presentation environment. The disclosed techniques transmit signatures, watermarks and/or presence status data to a central facility for presence detection and, thus, reduce computing resource requirements (e.g., network bandwidth, memory requirements, etc.). The disclosed systems, methods, apparatus, and articles of manufacture are accordingly directed to one or more improvement(s) in the operation of a machine such as a computer or other electronic and/or mechanical device.

Example 1 includes an apparatus comprising media identification circuitry to generate first signatures representative of first audio data associated with a monitored media device, a comparator to obtain second signatures from a portable meter, the second signatures representative of second audio data sensed by the portable meter, and compare the first signatures and the second signatures to determine a comparison result, presence detection circuitry to determine a presence status of a user based on the comparison result, the user associated with the portable meter, and network communication circuitry to transmit the presence status to a data processor to perform audience measurement based on the presence status.

Example 2 includes the apparatus of example 1, wherein the presence detection circuitry is to determine the presence status based on the comparison result and a radio frequency signal from the portable meter.

Example 3 includes the apparatus of any of example 1-2, wherein the presence status is to indicate the user is at least one of present or absent in a vicinity of the monitored media device, and the presence detection circuitry is to determine the presence status is to indicate the user is present in response to the comparison result satisfying a threshold.

Example 4 includes the apparatus of example 3, wherein the presence detection circuitry is to determine the presence status is to indicate the user is absent in response to the comparison result not satisfying the threshold.

Example 5 includes the apparatus of any of examples 1-4, wherein the media identification circuitry is to detect a first watermark in the first audio data and the comparator is to obtain a second watermark from the portable meter.

Example 6 includes the apparatus of example 5, wherein the comparison result is a first comparison result, and the comparator is to compare the first watermark and the second watermark to determine a second comparison result, and the presence detection circuitry is to determine the presence status based on the first comparison result and the second comparison result.

Example 7 includes the apparatus of any of examples 1-6, wherein the network communication circuitry is to transmit a prompt to the portable meter, the prompt to request the second signatures.

Example 8 includes an apparatus comprising at least one memory, instructions, and processor circuitry to execute the instructions to at least generate first signatures representative of first audio data associated with a monitored media device, obtain second signatures from a portable meter, the second signatures representative of second audio data sensed by the portable meter, compare the first signatures and the second signatures to determine a comparison result, determine a presence status of a user based on the comparison result, the user associated with the portable meter, and transmit the presence status to a data processor to perform audience measurement based on the presence status.

Example 9 includes the apparatus of example 8, wherein the processor circuitry is to determine the presence status based on the comparison result and a radio frequency signal from the portable meter.

Example 10 includes the apparatus of any of examples 8-9, wherein the presence status is to indicate the user is at least one of present or absent in a vicinity of the monitored media device, and the processor circuitry is to determine the presence status is to indicate the user is present in response to the comparison result satisfying a threshold.

Example 11 includes the apparatus of example 10, wherein the processor circuitry is to determine the presence status is to indicate the user is absent in response to the comparison result not satisfying the threshold.

Example 12 includes the apparatus of any of examples 8-11, wherein the processor circuitry is to detect a first watermark in the first audio data and obtain a second watermark from the portable meter.

Example 13 includes the apparatus of example 12, wherein the comparison result is a first comparison result, and the processor circuitry is to compare the first watermark and the second watermark to determine a second comparison result and determine the presence status based on the first comparison result and the second comparison result.

Example 14 includes the apparatus of any of examples 8-13, wherein the processor circuitry is to transmit a prompt to the portable meter, the prompt to request the second signatures.

Example 15 includes at least one non-transitory computer readable medium comprising instructions which, when executed, cause a machine to at least generate first signatures representative of first audio data associated with a monitored media device, obtain second signatures from a portable meter, the second signatures representative of second audio data sensed by the portable meter, compare the first signatures and the second signatures to determine a comparison result, determine a presence status of a user based on the comparison result, the user associated with the portable meter, and transmit the presence status to a data processor to perform audience measurement based on the presence status.

Example 16 includes the at least one non-transitory computer readable storage medium of example 15, wherein the instructions cause the machine to determine the presence status based on the comparison result and a radio frequency signal from the portable meter.

Example 17 includes the at least one non-transitory computer readable storage medium of any of examples 15-17, wherein the presence status is to indicate the user is at least one of present or absent in a vicinity of the monitored media device, and the instructions cause the machine to determine the presence status is to indicate the user is present in response to the comparison result satisfying a threshold.

Example 18 includes the at least one non-transitory computer readable storage medium of example 17, wherein the instructions cause the machine to determine the presence status is to indicate the user is absent in response to the comparison result not satisfying the threshold.

Example 19 includes the at least one non-transitory computer readable storage medium of any of examples 15-18, wherein the instructions cause the machine to detect a first watermark in the first audio data and obtain a second watermark from the portable meter.

Example 20 includes the at least one non-transitory computer readable storage medium of example 19, wherein the comparison result is a first comparison result, and the instructions cause the machine to compare the first watermark and the second watermark to determine a second comparison result and determine the presence status based on the first comparison result and the second comparison result.

Example 21 includes the at least one non-transitory computer readable storage medium of any of examples 15-20, wherein the instructions cause the machine to transmit a prompt to the portable meter, the prompt to request the second signatures.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A portable meter device comprising:
    an audio sensor;
    a network interface;
    a processor; and
    a memory having stored thereon machine readable instructions that, when executed by the processor, cause the portable meter device to perform operations comprising:
        obtaining, via the audio sensor, an audio sample of a media presentation environment;
        generating first media identifying data based on the audio sample;
        obtaining, via the network interface, second media identifying data from a meter device associated with a media presentation device disposed at the media presentation environment;
        generating, based on the first media identifying data and the second media identifying data, a presence status characterizing a presence of a user at the media presentation environment; and
        transmitting, via the network interface, the presence status to a remote server.

2. The portable meter device of claim 1, wherein the presence status comprises:
    a presence score that is a numerical value characterizing the presence of the user at the media presentation environment.

3. The portable meter device of claim 1, wherein the first media identifying data and the second media identifying data each comprise at least one of: a signature or a watermark.

4. The portable meter device of claim 1, wherein generating, based on the first media identifying data and the second media identifying data, the presence status characterizing the presence of the user at the media presentation environment comprises:
    determining a similarity score characterizing a degree of similarity between the first media identifying data and the second media identifying data;
    determining whether the similarity score is above a threshold; and
    based on determining whether the similarity score is above the threshold, generating the presence status characterizing the presence of the user at the media presentation environment.

5. The portable meter device of claim 4, wherein the similarity score specifies a number of signatures or watermarks that match between the first media identifying data and the second media identifying data in a predefined monitoring interval.

6. The portable meter device of claim 1, wherein the operations further comprise:
    augmenting the presence status based on characteristics of radio frequency signals that are received by the portable meter device from the meter device associated with the media presentation device via the network interface.

7. The portable meter device of claim 1, wherein the audio sample is a first audio sample, and wherein the operations further comprise:
    receiving a prompt, via the network interface, and in response causing the audio sensor to obtain a second audio sample of the media presentation environment.

8. The portable meter device of claim 7, wherein the prompt is sent to the portable meter device in response to a detection of an event associated with a media presentation being presented by the media presentation device at the media presentation environment.

9. A non-transitory computer readable storage medium having stored thereon program instructions that, upon execution by a processor, cause performance of operations comprising:
    obtaining, via an audio sensor of a portable meter device, an audio sample of a media presentation environment;
    generating first media identifying data based on the audio sample;
    obtaining, via a network interface of the portable meter device, second media identifying data from a meter device associated with a media presentation device disposed at the media presentation environment;
    generating, based on the first media identifying data and the second media identifying data, a presence status characterizing a presence of a user at the media presentation environment; and
    transmitting, via the network interface, the presence status to a remote server.

10. The non-transitory computer readable storage medium of claim 9, wherein the presence status comprises:
    a presence score that is a numerical value characterizing the presence of the user at the media presentation environment.

11. The non-transitory computer readable storage medium of claim 9, wherein the first media identifying data and the second media identifying data each comprise at least one of: a signature or a watermark.

12. The non-transitory computer readable storage medium of claim 9, wherein generating, based on the first media identifying data and the second media identifying data, the presence status characterizing the presence of the user at the media presentation environment comprises:
    determining a similarity score characterizing a degree of similarity between the first media identifying data and the second media identifying data;
    determining whether the similarity score is above a threshold; and
    based on determining whether the similarity score is above the threshold, generating the presence status characterizing the presence of the user at the media presentation environment.

13. The non-transitory computer readable storage medium of claim 12, wherein the similarity score specifies a number of signatures or watermarks that match between the first media identifying data and the second media identifying data in a predefined monitoring interval.

14. The non-transitory computer readable storage medium of claim 9, wherein the operations further comprise:
augmenting the presence status based on characteristics of radio frequency signals that are received by the portable meter device from the meter device associated with the media presentation device via the network interface.

15. The non-transitory computer readable storage medium of claim 9, wherein the audio sample is a first audio sample, and wherein the operations further comprise:
receiving a prompt, via the network interface, and in response causing the audio sensor to obtain a second audio sample of the media presentation environment.

16. The non-transitory computer readable storage medium of claim 15, wherein the prompt is sent to the portable meter device in response to a detection of an event associated with a media presentation being presented by the media presentation device at the media presentation environment.

17. A method performed by a portable meter device, the method comprising:
obtaining, via an audio sensor of the portable meter device, an audio sample of a media presentation environment;
generating first media identifying data based on the audio sample;
obtaining, via a network interface of the portable meter device, second media identifying data from a meter device associated with a media presentation device disposed at the media presentation environment;
generating, based on the first media identifying data and the second media identifying data, a presence status characterizing a presence of a user at the media presentation environment; and
transmitting, via the network interface, the presence status to a remote server.

18. The method of claim 17, wherein the presence status comprises:
a presence score that is a numerical value characterizing the presence of the user at the media presentation environment.

19. The method of claim 17, wherein the first media identifying data and the second media identifying data each comprise at least one of: a signature or a watermark.

20. The method of claim 17, wherein generating, based on the first media identifying data and the second media identifying data, the presence status characterizing the presence of the user at the media presentation environment comprises:
determining a similarity score characterizing a degree of similarity between the first media identifying data and the second media identifying data;
determining whether the similarity score is above a threshold; and
based on determining whether the similarity score is above the threshold, generating the presence status characterizing the presence of the user at the media presentation environment.

* * * * *